(12) United States Patent
Huang

(10) Patent No.: US 12,526,780 B2
(45) Date of Patent: Jan. 13, 2026

(54) METHODS AND APPARATUSES FOR TRIGGERING UPLINK TRANSMISSION IN WIRELESS LOCAL AREA NETWORKS

(71) Applicant: GUANGDONG OPPO MOBILE TELECOMMUNICATIONS CORP., LTD., Guangdong (CN)

(72) Inventor: Lei Huang, Singapore (SG)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 342 days.

(21) Appl. No.: 18/323,661

(22) Filed: May 25, 2023

(65) Prior Publication Data
US 2023/0309070 A1    Sep. 28, 2023

Related U.S. Application Data

(63) Continuation of application No. PCT/CN2020/139147, filed on Dec. 24, 2020.

(51) Int. Cl.
*H04W 72/0446* (2023.01)
*H04W 72/21* (2023.01)
*H04W 84/12* (2009.01)

(52) U.S. Cl.
CPC ....... *H04W 72/0446* (2013.01); *H04W 72/21* (2023.01); *H04W 84/12* (2013.01)

(58) Field of Classification Search
CPC . H04W 72/0446; H04W 72/21; H04W 84/12; H04W 74/002; H04W 74/06; H04W 72/1268; H04W 72/0453; H04L 5/0094
See application file for complete search history.

(56) References Cited

U.S. PATENT DOCUMENTS

| | | | |
|---|---|---|---|
| 2018/0324840 A1 | 11/2018 | Kim et al. | |
| 2019/0124556 A1 | 4/2019 | Verma et al. | |
| 2020/0015234 A1 | 1/2020 | Li | |
| 2020/0322105 A1 | 10/2020 | Chitrakar et al. | |
| 2021/0144696 A1* | 5/2021 | Cariou | H04B 7/0452 |
| 2021/0227529 A1 | 7/2021 | Chu et al. | |

(Continued)

FOREIGN PATENT DOCUMENTS

| | | |
|---|---|---|
| CN | 109315013 A | 2/2019 |
| CN | 111669204 A | 9/2020 |

(Continued)

OTHER PUBLICATIONS

First Office Action of the Japanese application No. 2023-538757, issued on Oct. 1, 2024. 10 pages with English translation.

(Continued)

*Primary Examiner* — Sujoy K Kundu
*Assistant Examiner* — Raul Rivas
(74) *Attorney, Agent, or Firm* — PERKINS COIE LLP

(57) ABSTRACT

A method for triggering uplink transmission comprises generating, by an access point (AP), a trigger frame based on a type of physical layer protocol data unit (PPDU) transmissions to be solicited from a plurality of stations (STAs) in the WLAN, wherein a common information field of the trigger frame indicating whether or not a special user information field is present in the trigger frame; and transmitting the trigger frame to the plurality of STAs.

7 Claims, 11 Drawing Sheets

(56) References Cited

U.S. PATENT DOCUMENTS

| | | | |
|---|---|---|---|
| 2021/0258115 A1 | 8/2021 | Liu et al. | |
| 2021/0377368 A1 | 12/2021 | Han et al. | |
| 2021/0399864 A1 | 12/2021 | Lim et al. | |
| 2022/0150025 A1 | 5/2022 | Tian et al. | |

FOREIGN PATENT DOCUMENTS

| | | | | |
|---|---|---|---|---|
| CN | 111669824 A | 9/2020 | | |
| CN | 113346984 A | 9/2021 | | |
| CN | 113747580 A | 12/2021 | | |
| CN | 113765831 A | 12/2021 | | |
| CN | 113766440 A | 12/2021 | | |
| CN | 114641079 A | 6/2022 | | |
| JP | 2019527961 A | 10/2019 | | |
| JP | 7373287 B2 * | 11/2023 | ......... | H04L 27/2603 |
| KR | 20210149567 A | 12/2021 | | |
| WO | WO-2018016313 A1 * | 1/2018 | ........ | H04W 72/1221 |
| WO | 2020028015 A1 | 2/2020 | | |
| WO | 2021235746 A1 | 11/2021 | | |
| WO | 2021239131 A1 | 12/2021 | | |
| WO | 2021244405 A1 | 12/2021 | | |
| WO | 2022020682 A1 | 1/2022 | | |
| WO | 2022124722 A1 | 6/2022 | | |
| WO | 2022127377 A1 | 6/2022 | | |
| WO | 2022131815 A1 | 6/2022 | | |

OTHER PUBLICATIONS

Liwen Chu et al (NXP), "Trigger Consideration", Doc.: IEEE 802.11-20/0764r1, Date: May 12, 2020, pp. 1-10.
Chittabrata Ghosh et al (Intel Corporation), "Trigger Frame Format for 802.11az", doc.: IEEE 802.11-17/0758r1, Date: May 9, 2017, pp. 1-10.
Supplementary European Search Report in the European application No. 20966518.1, mailed on Nov. 22, 2023, 9 pages.
International Search Report in the international application No. PCT/CN2020/139147, mailed on Sep. 24, 2021.
Written Opinion of the International Search Authority in the international application No. PCT/CN2020/139147, mailed on Sep. 24, 2021.
Jinyoung Chun, AL. Affiliation: LG Electronics. UL BW subfield design in Trigger frame, Date: Dec. 16, 2020, doc. : IEEE 802.11-20/1911r1.https://mentor.ieee.org/802.11/dcn/20/11-20-1911-01-00be-ul-bw-subfield-design-in-trigger-frame.pptx.
Steve Shellhammer, AL. Affiliations: Qualcomm. "Enhanced Trigger Frame for EHT Support", Date: Dec. 7, 2020, doc. : IEEE 802.11-20/1429r3. https://mentor.ieee.org/802.11/dcn/20/11-20-1429-03-00be-enhanced-trigger-frame-for-eht-support.pptx.
Jonghun Han, AL. Affiliations: Samsung. "Trigger Frame for Frequency-domain A-PPDU Support", Date: May 20, 2020, doc.: IEEE 802.11-20/0831r2. https://mentor.ieee.org/802.11/dcn/20/11-20-0831-02-00be-trigger-frame-for-frequency-domain-a-ppdu-support.pptx.
Rui Cao, AL. Affiliations: NXP. "Aggregated PPDU for Large BW", Date: May 2, 2020, doc. : IEEE 802.11-20/0693r1. https://mentor.ieee.org/802.11/dcn/20/11-20-0693-01-00be-aggregated-ppdu-for-large-bw.pptx.
Geonjung Ko, AL. Affiliations: WILUS Inc. "TB PPDU Format Signaling in Trigger Frame", Date: Aug. 6, 2020, doc.: IEEE 802.11-20/1192r0. https://mentor.ieee.org/802.11/dcn/20/11-20-1192-00-00be-tb-ppdu-format-signaling-in-trigger-frame.pptx.
Steve Shellhammer, AL. Affiliations: Qualcomm."Enhanced Trigger Frame for EHT Support", Date: Sep. 14, 2020, doc.: IEEE 802.11-20/1429r1. https://mentor.ieee.org/802.11/dcn/20/11-20-1429-01-00be-enhanced-trigger-frame-for-eht-support.pptx.
Ming Gan, AL. Affiliations: Huawei Technologies, Co. LTD. "Backward compatible EHT trigger frame follow up", Date: Nov. 1, 2020, doc.: IEEE 802.11-20/1808-03-00be. https://mentor.ieee.org/802.11/dcn/20/11-20-1808-03-00be-backward-compatible-eht-trigger-frame-follow-up.pptx.
Jinyoung Chun, AL. Affiliation: LG Electronics. "UL BW subfield design in Trigger frame", Date: Dec. 1, 2020, doc.: IEEE 802.11-20/1911r0. https://mentor.ieee.org/802.11/dcn/20/11-20-1911-00-00be-ul-bw-subfield-design-in-trigger-frame.pptx.
Edward Au, Affiliation: Huawei, "IEEE P802.11 Wireless LANs, Specification framework for TGbe", Date: Nov. 10, 2020, doc.: IEEE 802.11-19/1262r20.
"IEEE P802.11ax™/D8.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN", Prepared by the 802.11 Working Group of the LAN/MAN Standards Committee of the IEEE Computer Society. IEEE P802.11ax™/D8.0, Oct. 2020 (amendment to IEEE P802.11REVmd/D5.0).
First Office Action of the European application No. 20966518.1, issued on Jul. 12, 2024. 12 pages.
First Office Action of the Chinese application No. 202080105078.3, issued on Sep. 5, 2024. 15 pages with English translation.
Third Office Action of the European application No. 20966518.1, issued on May 15, 2025. 6 pages.
First Office Action of the Korean application No. 10-2023-7022707, issued on Aug. 1, 2025. 9 pages with English translation.

* cited by examiner

| Trigger Type | UL Length | More TF | CS Required | UL BW | GI And HE-LTF Type | MU-MIMO HE-LTF mode | Number Of HE-LTF Symbols And Midamble Periodically |
|---|---|---|---|---|---|---|---|
| Bits: 4 | 12 | 1 | 1 | 2 | 2 | 1 | 3 |

| UL STBC | LDPC Extra Symbol Segment | AP TX Power | Pre-FEC Padding Factor | PE Disambiguity | UL Spatial Reuse | Doppler | A-PPDU Flag |
|---|---|---|---|---|---|---|---|
| Bits: 1 | 1 | 1 | 2 | 1 | 16 | 1 | 1 |

| UL HE-SIG-A2 Reserved | Enhanced Tigger Frame Flag |
|---|---|
| Bits: 8 | 1 |

Figure 9

| Trigger Type | UL Length | More TF | CS Required | UL BW | GI And HE-LTF Type | MU-MIMO HE-LTF mode | Number Of HE-LTF Symbols And Midamble Periodically |
|---|---|---|---|---|---|---|---|
| Bits: 4 | 12 | 1 | 1 | 2 | 2 | 1 | 3 |

| UL STBC | LDPC Extra Symbol Segment | AP TX Power | Pre-FEC Padding Factor | PE Disambiguity | UL Spatial Reuse | Doppler | A-PPDU Flag |
|---|---|---|---|---|---|---|---|
| Bits: 1 | 1 | 1 | 2 | 1 | 16 | 1 | 1 |

| Number Of EHT-LTF Symbols | UL HE-SIG-A2 Reserved | Enhanced Tigger Frame Flag |
|---|---|---|
| Bits: 3 | 5 | 1 |

Figure 10

METHODS AND APPARATUSES FOR TRIGGERING UPLINK TRANSMISSION IN WIRELESS LOCAL AREA NETWORKS

CROSS-REFERENCE TO RELATED APPLICATION

This is a continuation of International Application No. PCT/CN2020/139147 filed on Dec. 24, 2020, the disclosure of which is hereby incorporated by reference in its entirety.

BACKGROUND

Institute of Electrical and Electronics Engineers (IEEE) 802.11be extremely high throughput (EHT) wireless local area network (WLAN) supports a bandwidth (BW) up to 320 MHz. It is expected that high efficiency (HE) stations (STAs) will exist with R1 (Release 1) EHT STAs and/or R2 (Release 2) EHT STAs in a same EHT basic service set (BSS). In order to maximize throughput of an EHT BSS with large BW, e.g. 320 MHz, a frequency domain aggregated physical layer protocol data unit (FD-A-PPDU) supported by HE STAs and R2 EHT STAs has been proposed. It should be noted that R1 EHT STAs do not support FD-A-PPDU transmission and reception.

In wireless communications, a trigger frame may be generated by an access point (AP) and used to solicit physical layer protocol data unit (PPDU) transmissions from a plurality of STAs. However, as different types of PPDU transmissions will exist in IEEE 802.11be EHT WLAN, e.g. HE triggered-based (TB) PPDU transmission from HE STAs, R1 EHT STAs and/or R2 EHT STAs, EHT TB PPDU transmission from R1 EHT STAs and/or R2 EHT STAs, and TB FD-A-PPDU transmission from both HE STAs and R2 EHT STAs, it would therefore be desirable to provide an enhanced trigger frame suitable for triggering different types of PPDU transmissions in WLAN.

SUMMARY

The invention relates to wireless communications. Embodiments of the invention provide methods and apparatuses for triggering different types of uplink transmission in a WLAN with a proposed enhanced trigger frame.

According to a first aspect of the invention, various embodiments of the invention provide a method for triggering uplink transmission in a WLAN. The method may be implemented by an AP in the WLAN and comprises: generating, by an access point (AP), a trigger frame based on a type of PPDU transmissions to be solicited from a plurality of stations (STAs) in the WLAN, wherein a common information field of the trigger frame comprises a first subfield indicating whether the trigger frame is a first type trigger frame or a second type trigger frame, and if the trigger frame is the second type trigger frame, the common information field further comprises a second subfield indicating the type of the PPDU transmissions, and transmitting, by the AP, the generated trigger frame to the plurality of STAs.

According to a second aspect of the invention, various embodiments of the invention provide an AP for triggering uplink transmission in a WILAN. The AP comprises: a memory configured to store instructions for triggering uplink transmission in the WLAN, and a processor communicably coupled with the memory, the processor configured to execute the instructions to: generate a trigger frame based on a type of PPDU transmissions to be solicited from a plurality of stations (STAs) in the WLAN, wherein a common information field of the trigger frame comprises a first subfield indicating whether the trigger frame is a first type trigger frame or a second type trigger frame, and if the trigger frame is the second type trigger frame, the common information field further comprises a second subfield indicating the type of the PPDU transmissions, and transmit the generated trigger frame to the plurality of STAs.

According to a third aspect of the invention, various embodiments of the invention provide a method for triggering uplink transmission in WLAN. The method may be implemented by a STA in the WLAN and comprises: receiving, by a STA, a trigger frame from an access point (AP), wherein the trigger frame is generated based on a type of PPDU transmissions to be solicited from a plurality of STAs, wherein a common information field of the trigger frame comprises a first subfield indicating whether the trigger frame is a first type trigger frame or a second type trigger frame, and if the trigger frame is the second type trigger frame, the common information field further comprises a second subfield indicating the type of the PPDU transmissions, and determining, by the STA, the type of the solicited PPDU transmissions by decoding the common information field of the received trigger frame.

According to a fourth aspect of the invention, various embodiments of the invention provide a STA. The STA comprises: a memory to store instructions for triggering uplink transmission in the WLAN, and a processor communicably coupled with the memory, the processor configured to execute the instructions to: receive a trigger frame from an access point (AP), wherein the trigger frame is generated based on a type of PPDU transmissions to be solicited from a plurality of STAs, wherein a common information field of the trigger frame comprises a first subfield indicating whether the trigger frame is a first type trigger frame or a second type trigger frame, and if the trigger frame is the second type trigger frame, the common information field further comprises a second subfield indicating the type of the PPDU transmissions, and determine the type of the solicited PPDU transmissions by decoding the common information field of the received trigger frame.

According to a fifth aspect of the invention, various embodiments of the invention provide a computer program product. The computer program product comprises instructions to cause a computer to perform a method for triggering uplink transmission in WLAN according to any embodiment of the invention, when executed thereon.

BRIEF DESCRIPTION OF THE DRAWINGS

The invention will be described in detail with reference to the accompanying drawings, in which:

FIG. 9 is a block diagram illustrating a format of the common information field of a trigger frame according to a first embodiment of the invention;

FIG. 10 is a block diagram illustrating a format of the common information field of a trigger frame according to a second embodiment of the invention.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

Embodiments described in the context of one of the methods or apparatuses are analogously valid for the other methods or apparatuses. Similarly, embodiments described in the context of a method are analogously valid for an apparatus, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels, and are not intended to impose numerical requirements on their objects. As used herein, the term "configured to" is interchangeable with "operative" or "adapted to".

Embodiments of the invention propose a trigger frame which can be used to solicit different types of PPDU transmissions in a WLAN. Compared to the existing trigger frame, the enhanced trigger frame proposed by the embodiments of the invention further includes a first subfield in a common information field or common info field of the trigger frame to indicate whether the trigger frame is a first type trigger frame, i.e. an 802.11ax trigger frame, or a second type trigger frame, i.e. the proposed enhanced trigger frame, and if the trigger frame is the second type trigger frame, the common information field of the trigger frame further includes a second subfield in the common information field to indicate the type of PPDU transmissions to be solicited.

Figure 1A:
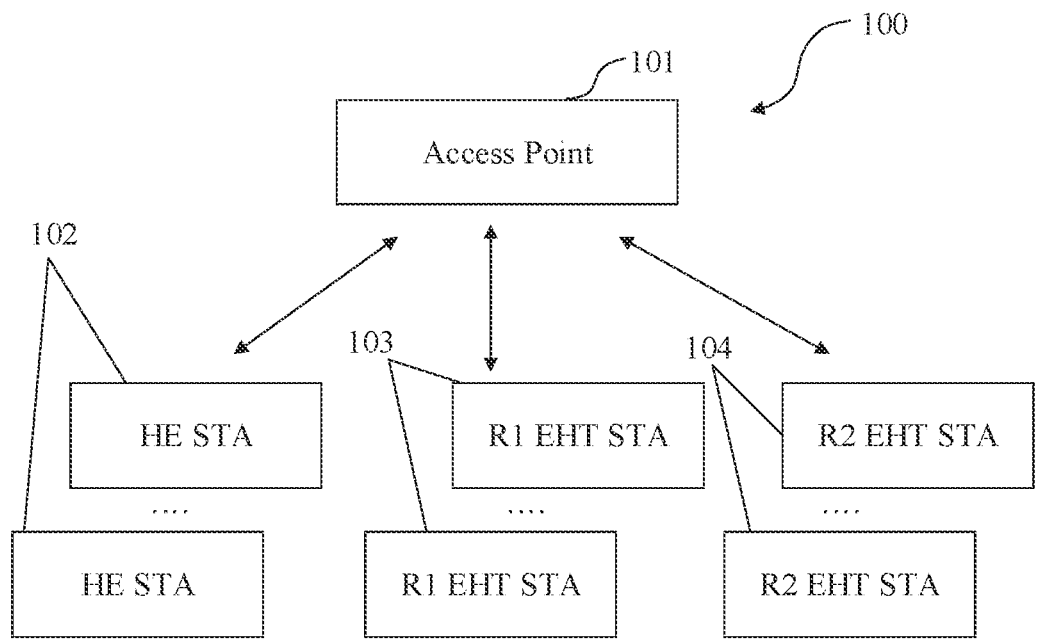
FIG. 1A is a schematic diagram showing an example of a WLAN according to some embodiments of the invention.

FIG. 1A is a schematic diagram showing an example of a WLAN 100 according to some embodiments of the invention. As shown in FIG. 1A, the WLAN 100 includes an AP 101 and a plurality of different types of STAs, e.g. HE STAs 102, R1 EHT STAs 103 and R2 EHT STAs 104. In the WLAN 100, a trigger frame may be used to solicit the following three different types of PPDU transmissions.

Figure 1B:
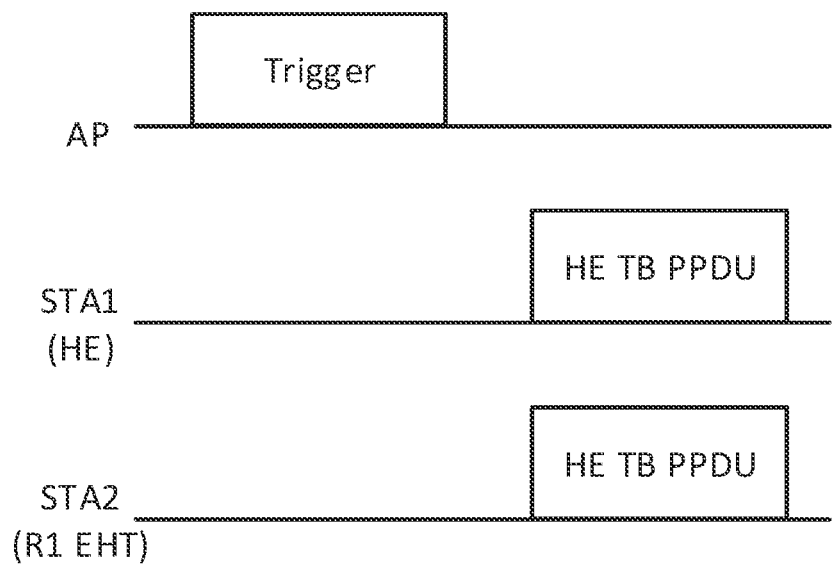
FIG. 1B is a schematic diagram showing an example of the first type PPDU transmission in a WLAN.

First type PPDU transmission: the first type PPDU transmission comprises a plurality of HE TB PPDUs transmitted from a plurality of HE STAs 102, R1 EHT STAs 103 and/or R2 EHT STAs 104. FIG. 1B is a schematic diagram showing an example of the first type PPDU transmission in WLAN 100. In this example, the trigger frame is used to solicit HE TB PPDU transmission from an HE STA (STA1) and a R1 EHT STA (STA2).

Figure 1C:
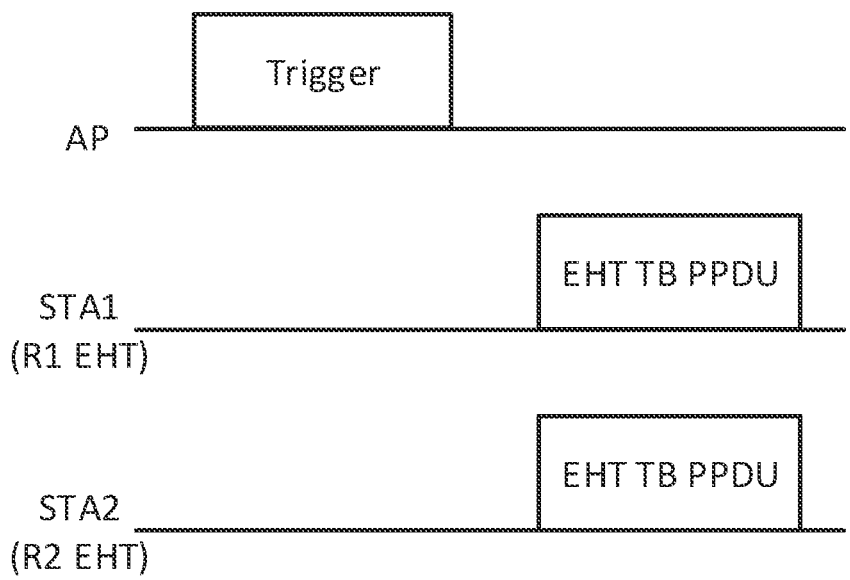
FIG. 1C is a schematic diagram showing an example of the second type PPDU transmission in a WLAN.

Second type PPDU transmission: the second type PPDU transmission comprises a plurality of EHT TB PPDUs transmitted from a plurality of R1 EHT STAs 103 and/or R2 EHT STAs 104. FIG. 1C is a schematic diagram showing an example of the second type PPDU transmission in WLAN 100. In this example, the trigger frame is used to solicit EHT TB PPDU transmission from a R1 EHT STA (STA1), and a R2 EHT STA (STA2).

Figure 1D:
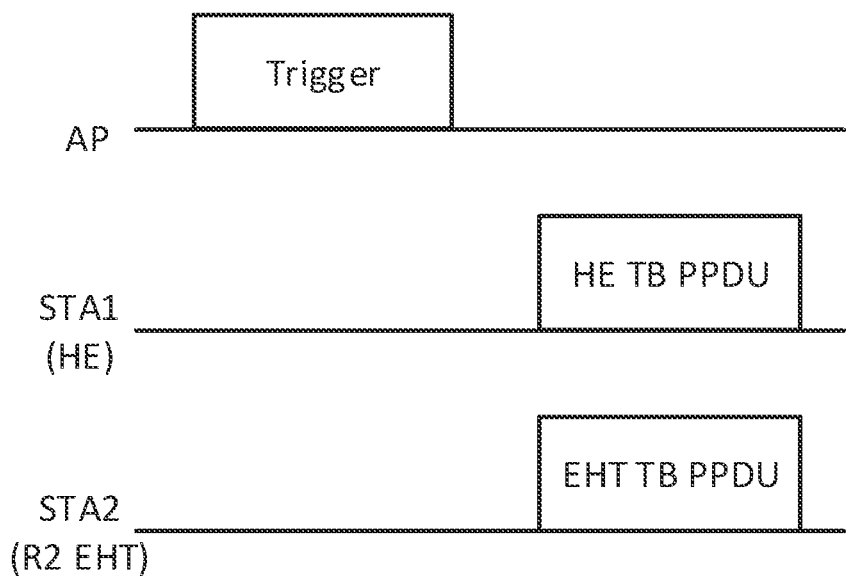
FIG. 1D is a schematic diagram showing an example of the third type PPDU transmission in a WLAN.

Third type PPDU transmission: the third type PPDU transmission comprises a TB FD-A-PPDU transmission from at least one HE STA 102 and at least one R2 EHT STA 104, wherein the TB FD-A-PPDU transmission comprises a HE TB PPDU transmission and an EHT TB PPDU transmission. The HE TB PPDU transmission may include at least one HE TB PPDU transmitted from at least one HE STA 102 and/or at least one R2 EHT STA 104. The EHT TB PPDU transmission may include at least one EHT TB PPDU transmitted from at least one R2 EHT STA. FIG. 1D is a schematic diagram showing an example of the third type PPDU transmission in WLAN 100. In this example, the trigger frame is used to solicit a TB FD-A-PPDU transmission from an HE STA (STA1) and a R2 EHT STA (STA2).

Figure 1E:
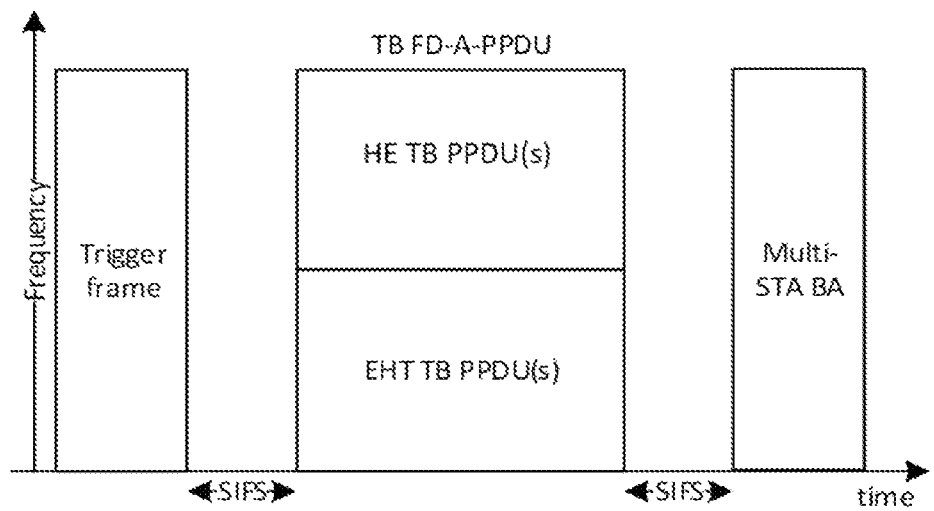
FIG. 1E is a schematic diagram illustrating an uplink multi-user (MU) transmission according to one embodiment of the invention.

FIG. 1E is a schematic diagram illustrating an uplink multi-user (MU) transmission according to one embodiment of the invention. In the uplink transmission, a trigger frame from an AP is used to solicit a third type PPDU transmission, i.e. a TB FD-A-PPDU transmission from a plurality of HE STAs and R2 EHT STAs. Each of the scheduled HE STAs and R2 EHT STAs will transmit a TB PPDU based on the scheduling information in the received trigger frame. The TB PPDU transmitted by each scheduled HE STA is an HE TB PPDU, while the TB PPDU transmitted by each scheduled R2 EHT STA is an HE TB PPDU or an EHT TB PPDU. A TB FD-A-PPDU transmission includes an HE TB PPDU transmission comprising one or more HE TB PPDUs and an EHT TB PPDU transmission comprising one or more EHT TB PPDUs. The one or more HE TB PPDUs and one or more EHT TB PPDUs are transmitted by scheduled STAs at non-overlapping frequency-domain resource and/or spatial domain resource in a 320 MHz channel. The AP will transmit a Multi-STA Block Acknowledgement (BA) frame in a response to the received TB FD-A-PPDU.

Figure 1F:
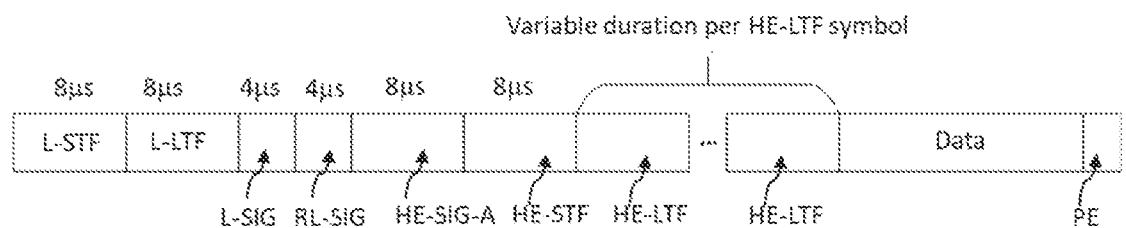
FIG. 1F is a block diagram illustrating a format of an HE TB PPDU
Figure 1G:
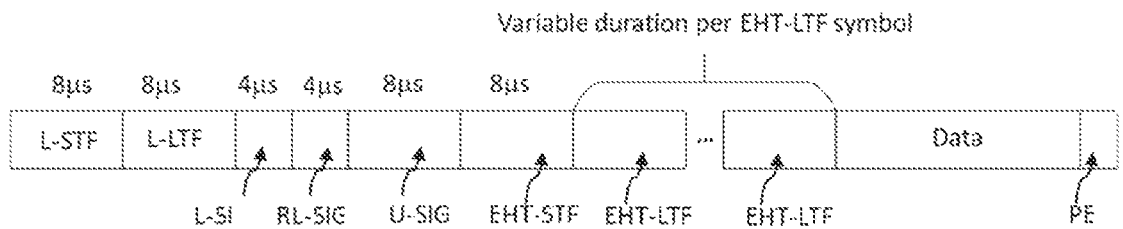
FIG. 1G is block diagram illustrating a format of an EHT TB PPDU.

FIG. 1F and FIG. 1G are block diagrams illustrating the formats of an HE TB PPDU and an EHT TB PPDU respectively. In a HE TB PPDU, the Non-HT Short Training field (L-STF), Non-HT Long Training field (L-LTF), Non-HT SIGNAL field (L-SIG), Repeated L-SIG (RL-SIG) field and HE SIGNAL A field (HE-SIG-A) are called pre-HE modulated fields while the HE Short Training field (HE-STF), HE Long Training field (HE-LTF), Data field and packet extension (PE) field are called HE modulated fields. In an EHT TB PPDU, the L-STF, L-LTF, L-SIG field, RL-SIG field and universal SIGNAL (U-SIG) field are called pre-EHT modulated fields while the EHT-STF, EHT-LTF, Data field and PE field are called EHT modulated fields.

Each HE-LTF or EHT-LTF symbol has the same guard interval (GI) duration as each data symbol, which is 0.8 μs, 1.6 μs or 3.2 μs. The HE-LTF field includes three types: 1×HE-LTF, 2×HE-LTF and 4×HE-LTF. Similarly, the EHT-LTF field includes three types: 1×EHT-LTF, 2×EHT-LTF and 4×EHT-LTF. The duration of each 1×HE-LTF/EHT-LTF, 2×HE-LTF/EHT-LTF or 4×HE-LTF/EHT-LTF symbol without GI is 3.2 μs, 6.4 μs or 12.8 μs. Each data symbol without GI is 12.8 μs. The PE field duration of a HE TB PPDU is 0 μs, 4 μs, 8 μs, 12 μs or 16 μs; while the PE field duration of an EHT TB PPDU is 0 μs, 4 μs, 8 μs, 12 μs, 16 μs or 20 μs.

In an EHT BSS with a large BW, e.g. 320 MHz, a trigger frame can be used to solicit TB FD-A-PPDU transmission from a plurality of HE STAs and R2 EHT STAs. A TB FD-A-PPDU may include at least one HE TB PPDU and at least one EHT TB PPDU, wherein the HE-LTF field of the HE TB PPDU has a same symbol duration and a same GI duration as the EHT-LTF field of the EHT TB PPDU. The number of HE-LTF symbols in the HE TB PPDU may be the same as or different from the number of EHT-LTF symbols in the EHT TB PPDU. When the number of HE-LTF symbols is the same as the number of EHT-LTF symbols, each HE-LTF/EHT-LTF symbol may have a different duration or a same duration from each data symbol. In other words, each HE-LTF/EHT-LTF symbol without GI may be 6.4 μs or 12.8 μs. When the number of HE-LTF symbols is different from the number of EHT-LTF symbols, each HE-LTF/EHT-LTF symbol shall have a same duration as each data symbol. In other words, each HE-LTF/EHT-LTF symbol without GI shall be 12.8 μs. As a result, the pre-HE modulated fields of HE TB PPDU and the pre-EHT modulated fields of EHT TB PPDU can be kept orthogonal in frequency domain symbol-by-symbol.

Figure 2A:
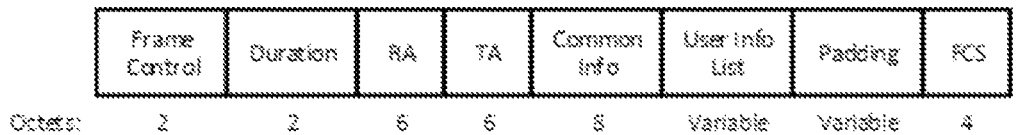
FIG. 2A is a block diagram illustrating a trigger frame format according to one embodiment of the invention.

FIG. 2A is a block diagram illustrating a trigger frame format according to one embodiment of the invention. As shown in FIG. 2A, the trigger frame includes a common information field and a user information list field or user info list field. The common information field further includes a first subfield indicating whether the trigger frame is a first type trigger frame, i.e. an 802.11ax trigger frame, or a second type trigger frame, i.e. the proposed enhanced trigger frame, and if the trigger frame is a second type trigger frame, the common information field further includes a second subfield indicating the type of PPDU transmissions to be solicited, or whether the trigger frame is used to solicit the second type PPDU transmission or the third type PPDU transmission.

The user information list field may comprise three types of user information fields including HE format user information/info fields, EHT format user information/info fields and special user information/info field. The types of user information fields included in the user information list are determined based on the type of PPDU transmissions to be solicited. This will be described in detail below in some embodiments of the invention. The HE format user information field is defined in the IEEE 802.11ax specification.

Figure 2B:
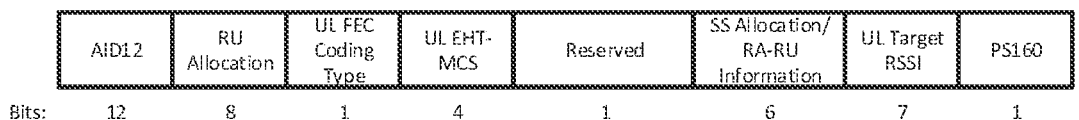
FIG. 2B is a block diagram illustrating an example of an EHT format user information field format according to one embodiment of the invention.

FIG. 2B is a block diagram illustrating an example of the EHT format user information field format according to one embodiment of the invention. The resource unit (RU) allocation subfield together with the PS160 subfield in the EHT format user information field may be used to indicate the RU or multiple resource unit (MRU) at which a TB PPDU is to be transmitted by a STA indicated by the AID12 subfield of the EHT format user information field, i.e. a STA has an AID which is matched with the AID12 field of the EHT format user information field. Since the EHT format user info field is designed to be backward compatible with the HE format user info field, in some embodiments of the invention, a STA may determine its allocated RU or MRU by only decoding a user info field with an AID12 subfield which is matched with an AID of the STA, without knowing a priori whether the user info field is an HE format user info field or an EHT format user info field.

Figure 2C:
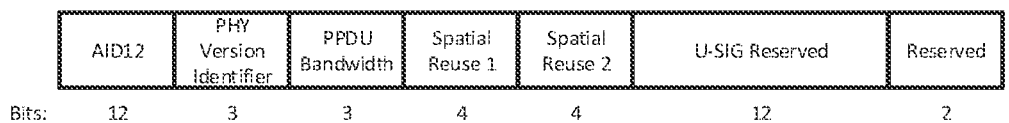
FIG. 2C shows an example of a format of a special user information field according to one embodiment of the invention.

The special user information field carries necessary U-SIG subfields of the solicited EHT TB PPDUs. The special user information field is located immediately after the common information field in the trigger frame. FIG. 2C shows an example of the format of the special user info field according to one embodiment of the invention. In this example, the AID12 subfield is set to a first value, e.g. 2007, to indicate the special user information field. The PPDU bandwidth (PPDU BW) subfield is used to indicate the BW allocated for EHT TB PPDU transmission.

Figure 3:
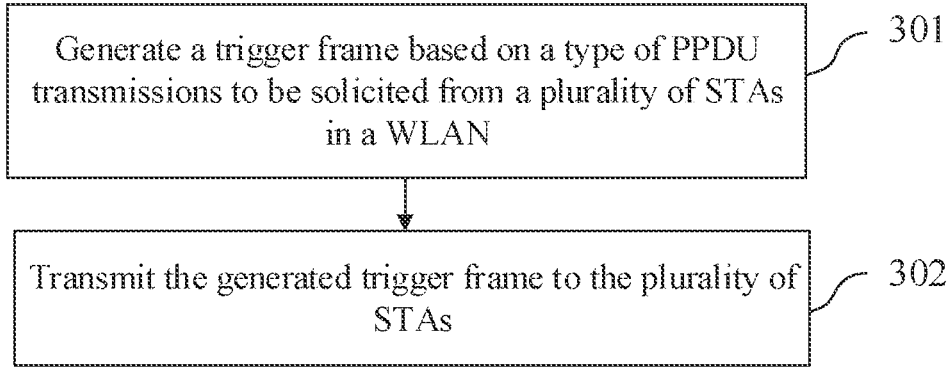
FIG. 3 is a flowchart illustrating a method for triggering uplink transmission in WLAN implemented by an AP according to one embodiment of the invention.

FIG. 3 is a flowchart illustrating a method 300 for triggering uplink transmission in WLAN 100 implemented by an AP according to one embodiment of the invention. In this embodiment of the invention, the method 300 is implemented by an AP, e.g. the AP 101 in FIG. 1A. In other embodiments, the method 300 may be implemented by any other suitable network interface device.

At block 301, a trigger frame is generated by the AP 101 based on a type of PPDU transmissions to be solicited from a plurality of STAs in the WLAN, e.g. the HE STAs 102, R1 EHT STAs 103 and/or R2 EHT STAs 104. A common information field of the generated trigger frame includes a first subfield indicating whether the trigger frame is a first type trigger frame, i.e. an 802.11ax trigger frame, or a second type trigger frame, i.e. the enhanced trigger frame proposed by embodiments of the invention, and if the trigger frame is the second type trigger frame, the trigger frame further includes a second subfield indicating the type of the PPDU transmissions, or whether the trigger frame is used to solicit the second type PPDU transmission or the third type PPDU transmission.

At block 302, the generated trigger frame is transmitted to the plurality of STAs.

In this embodiment, the first subfield may be set to 0 or 1 to indicate whether the generated trigger frame is a first type trigger frame or a second type trigger frame. For example, if the trigger frame is the first type trigger frame, the first subfield is set to 0; and if the trigger frame is the second type trigger frame, the first subfield is set to 1. For another example, if the trigger frame is the first type trigger frame, the first subfield is set to 1; and if the trigger frame is the second type trigger frame, the first subfield is set to 0.

In this embodiment, if the first type PPDU transmission is to be solicited, the first subfield of the common information is set to indicate that the generated trigger frame is the first type trigger frame, and a UL BW subfield of the common information field is set to indicate the BW allocated for the first type PPDU transmission.

In this embodiment, if the second type PPDU transmission is to be solicited, the first subfield of the common information field is set to indicate that the type of the trigger frame is the second type trigger frame, and the second subfield of the common information field is set to indicate that the type of PPDU transmissions to be solicited is the second type PPDU transmission.

When the second type PPDU transmission is to be solicited, at least one subfield for resource unit (RU) allocation, e.g. a RU allocation subfield and a PS160 subfield of an EHT format user information field of the generated trigger frame is set to indicate a RU or a multiple resource unit (MRU) at which an EHT TB PPDU to be transmitted by a STA indicated by an AID12 subfield of the EHT format user information field; and a subfield of a special user information field, e.g. a PPDU BW subfield, is set to indicate a bandwidth (BW) allocated for the second type PPDU transmission.

In this embodiment, if the third type PPDU transmission is to be solicited, the first subfield of the common information field is set to indicate that the type of the trigger frame is the second type trigger frame and the second subfield is set to indicate that the type of PPDU transmissions is the third type PPDU transmission.

In this embodiment, the second subfield of the common information field may be set to 0 or 1 to indicate the type of PPDU transmissions. For example, if the type of PPDU transmissions to be solicited is the second type PPDU transmission, the second subfield is set to 0, and if the type of PPDU transmissions to be solicited is the third type PPDU transmission, the second subfield is set to 1. For another example, if the type of PPDU transmissions to be solicited is the second type PPDU transmission, the second subfield is set to 1, and if the type of PPDU transmissions to be solicited is the third type PPDU transmission, the second subfield is set to 0.

When the third type PPDU transmission is to be solicited, a UL BW subfield of the common information field is set to indicate the BW allocated for the HE TB PPDU transmission of the third type PPDU transmission, at least one subfield for RU allocation of a user information field, e.g. a RU allocation subfield and a PS160 subfield of an EHT format user information field or a RU allocation subfield of a HE format user information field, of the generated trigger frame is set to indicate a RU or a MRU at which a TB PPDU to be transmitted by a STA indicated by an AID12 subfield of the user information field; and a subfield of a special user information field, e.g. a PPDU BW subfield, is set to indicate a BW allocated for the EHT TB PPDU transmission of the third type PPDU transmission.

Figure 4A:
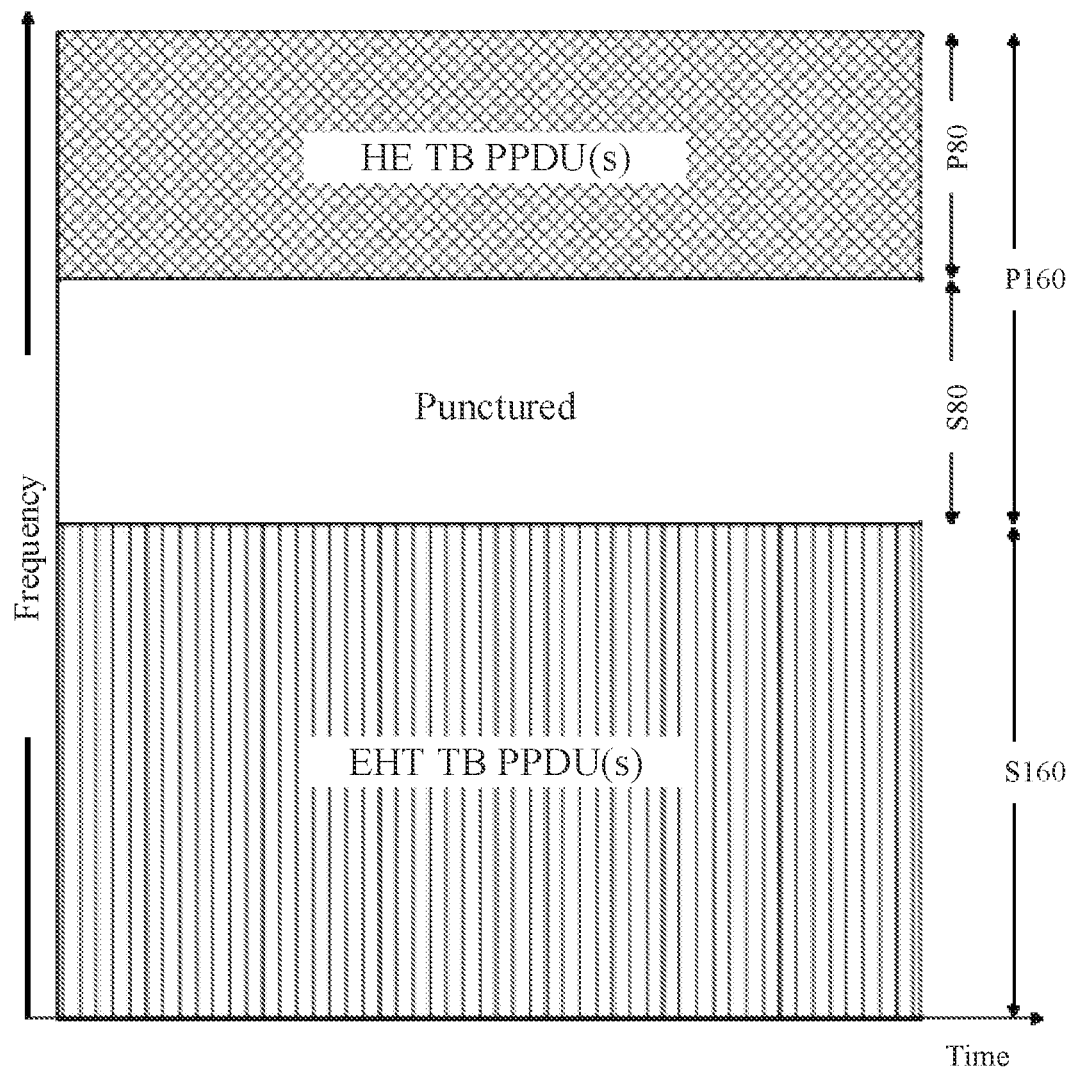
FIG. 4A to FIG. 4C show three options for BW allocation for the TB FD-A-PPDU transmission according to one embodiment of the invention respectively.

In this embodiment, when the third type PPDU transmission is to be solicited, in a 320 MHz BW TB FD-A-PPDU, the BW allocated for the HE TB PPDU transmission is a primary 80 MHz channel (P80) or a primary 160 MHz channel (P160); while the BW allocated for the EHT PPDU transmission from R2 EHT STAs is a secondary 160 MHz channel (S160) or one of two 80 MHz frequency segments of a S160. For a 320 MHz BW FD-A-PPDU transmission, there may have the following three options for BW allocation for the TB FD-A-PPDU transmission:

Option 1: As shown in FIG. 4A, if the UL BW subfield of the common information field is set to indicate 80 MHz BW and the PPDU BW subfield of the special user information field is set to indicate 160 MHz BW, a primary 80 MHz channel is allocated for the HE TB PPDU transmission and a secondary 160 MHz channel is allocated for the EHT TB PPDU transmission.

Figure 4B:
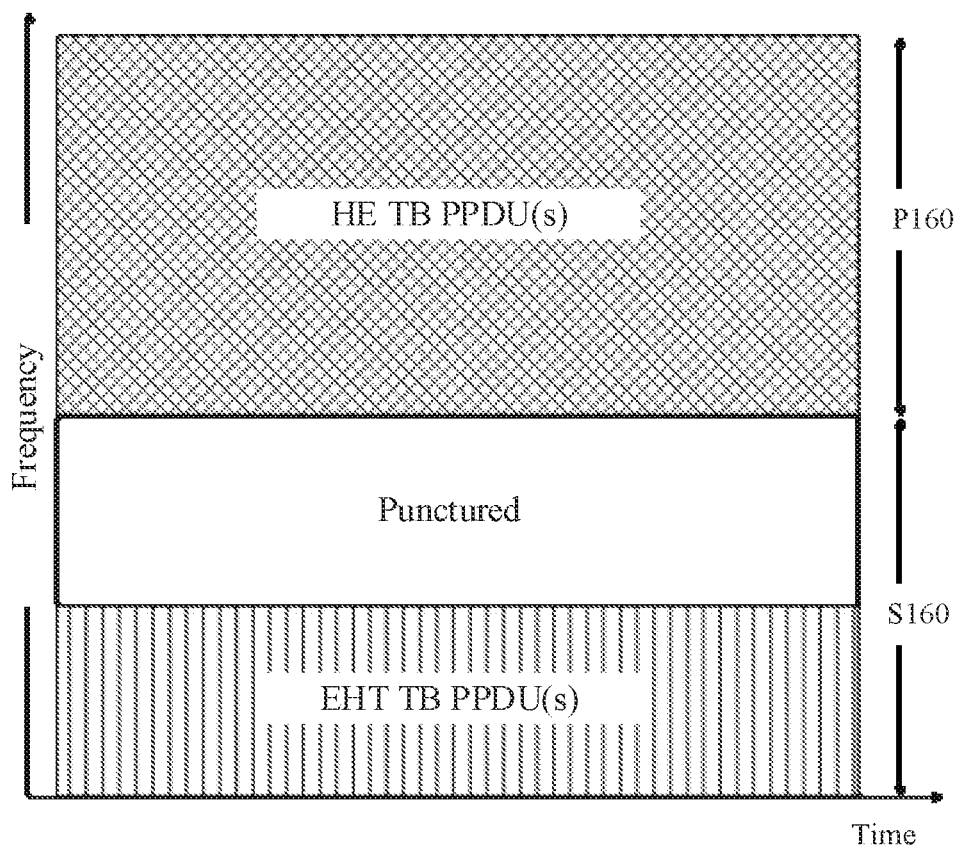

Option 2: As shown in FIG. 4B, if the UL BW subfield of the common information field is set to indicate 160 MHz BW and the PPDU BW subfield of the special user information field is set to indicate 80 MHz BW, a primary 160 MHz channel is allocated for the HE TB PPDU transmission, and an unpunctured 80 MHz frequency segment of a secondary 160 MHz channel is allocated for the EHT TB PPDU transmission.

Figure 4C:
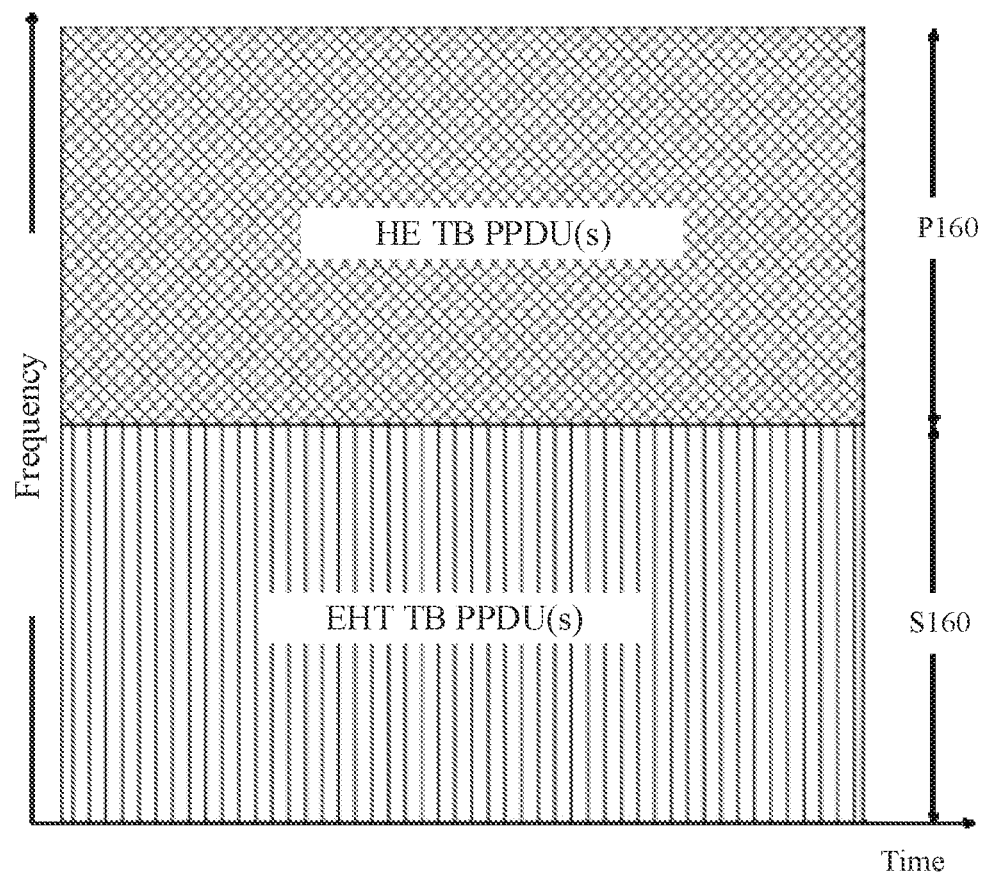

Option 3: As shown in FIG. 4C, if the UL BW subfield of the common information field is set to indicate 160 MHz BW and the PPDU BW subfield of the special user information field is set to indicate 160 MHz BW, a primary 160 MHz channel is allocated for the HE TB PPDU transmission, and a secondary 160 MHz channel is accolated for the EHT TB PPDU transmission.

In this embodiment, when the third type PPDU transmission is to be solicited, if the number of HE-LTF symbols in each HE TB PPDU to be solicited is the same as the number of the EHT-LTF symbols in each EHT TB PPDU to be solicited, a third subfield of the common information field, e.g. a subfield named "Number of HE-LTF Symbols And Midamble Periodically", is set to indicate a count number of HE-LTF symbols in each HE TB PPDU to be solicited or a count number of EHT-LTF symbols in each EHT TB PPDU to be solicited.

In this embodiment, when the third type PPDU transmission is to be solicited, if the number of HE-LTF symbols in each HE TB PPDU to be solicited may be different from the number of the EHT-LTF symbols in each EHT TB PPDU to be solicited, a third subfield of the common information field, e.g. a subfield named "Number of HE-LTF Symbols And Midamble Periodically", is set to indicate a count number of HE-LTF symbols in each HE TB PPDU to be solicited; and a fourth subfield of the common information field is set to indicate a count number of EHT-LTF symbols in each EHT TB PPDU to be solicited. It should be noted that the fourth subfield is a newly added subfield in the common information field of the trigger frame.

In this embodiment, the UL BW subfield of the common information field may be set according to a predetermined encoding rule of the UL BW subfield; the subfield, e.g. the PPDU BW subfield, of the special user information field may be set according to a predetermined encoding rule of this subfield; the third subfield may be set based on a value indicated in the Doppler subfield of the common information field and a predetermined encoding rule of the third subfield, and the fourth subfield may be set according to a predetermined rule of the fourth subfield.

Figure 5A:
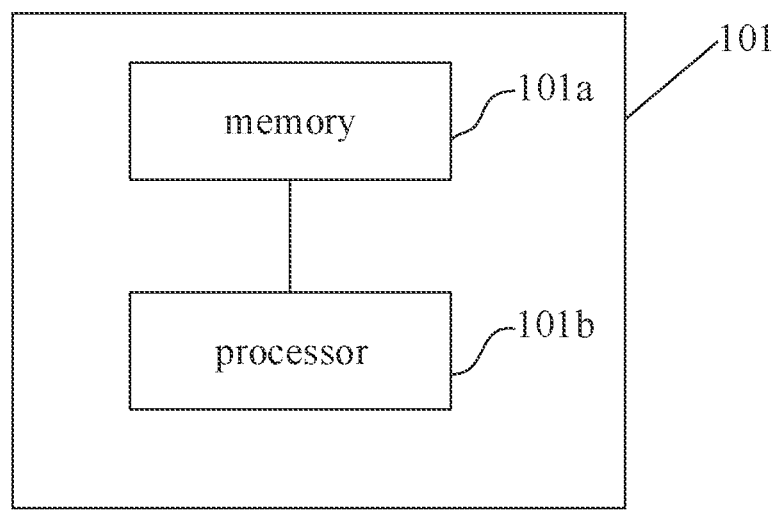
FIG. 5A is a schematic diagram illustrating an AP for triggering uplink transmission in a WLAN according to one embodiment of the invention.

FIG. 5A is a schematic diagram illustrating an AP 101 for triggering uplink transmission in the WLAN 100 according to one embodiment of the invention. The AP 101 includes a memory 101a configured to store instructions for triggering uplink transmission in the WLAN, and a processor 101*b* communicably coupled with the memory, the processor 101*b* configured to execute the instructions to perform the method for triggering uplink transmission in a WLAN according to some embodiments of the invention, e.g. the method described above and illustrated in FIG. 3.

In this embodiment, the processor 101*b* is configured to execute the instructions to generate a trigger frame based on a type of PPDU transmissions to be solicited from a plurality of stations (STAs) in the WLAN, wherein a common information field of the trigger frame comprises a first subfield indicating whether the trigger frame is a first type trigger frame or a second type trigger frame, and if the trigger frame is the second type trigger frame, the common information field further comprises a second subfield indicating the type of the PPDU transmissions, and transmit the generated trigger frame to the plurality of STAs.

In this embodiment, if a first type PPDU transmission is to be solicited, the processor 101*b* is further configured to execute the instructions to set the first subfield of the common information field to indicate that the generated trigger frame is the first type trigger frame. Further, the processor 101*b* is configured to execute the instructions to set a UL BW subfield of the common information field to indicate a BW allocated for the first type PPDU transmission.

In this embodiment, if the second type PPDU transmission is to be solicited, the processor 101*b* is further configured to execute the instructions to set the first subfield of the common information field to indicate that the type of the trigger frame is the second type trigger frame, and set the second subfield of the common information field to indicate that the type of PPDU transmissions is the second type PPDU transmission. Further, the processor 101*b* is configured to execute the instructions to set at least one subfield for RU allocation, e.g. the RU allocation subfield and the PS160 subfield, of an EHT format user information field of the trigger frame to indicate a RU or a MRU at which an EHT TB PPDU to be transmitted by a STA indicated by an AID12 subfield of the EHT format user information field; and set a subfield, e.g. the PPDU BW subfield, of a special user information field to indicate a BW allocated for the second type PPDU transmission.

In this embodiment, if the third type PPDU transmission is to be solicited, the processor 101*b* is further configured to execute instructions to set the first subfield of the common information field to indicate that the type of the trigger frame is the second type trigger frame, and set the second subfield of the common information field to indicate that the type of PPDU transmissions is the third type PPDU transmission. Further, the processor 101*b* is configured to execute instructions to set a UL BW subfield of the common information field to indicate a BW allocated for the HE TB PPDU transmission, and set at least one subfield for RU allocation of a user information field, e.g. the RU allocation subfield and the PS160 subfield of an EHT format user information field or the RU allocation subfield of an HE format user information field, of the trigger frame to indicate a RU or a MRU at which a TB PPDU to be transmitted by a STA indicated by an AID12 subfield of the user information field; and set a subfield, e.g. the PPDU BW subfield, of a special user information field of the trigger frame to indicate a BW allocated for the EHT TB PPDU transmission.

To establish a link between the BW allocations and the channel allocations for the HE TB PPDU transmission and EHT TB PPDU transmission in the TB FD-A-PPDU transmission, the processor 101*b* is further configured to execute the instructions to allocate a primary 80 MHz channel for the HE TB PPDU transmission, and allocate a secondary 160 MHz channel for the EHT TB PPDU transmission if the UL BW subfield of the common information field is set to indicate 80 MHz BW and the subfield of the special user information field is set to indicate 160 MHz BW; allocate a primary 160 MHz channel for the HE TB PPDU transmission, and allocate an unpunctured 80 MHz frequency segment of a secondary 160 MHz channel for the EHT TB PPDU transmission if the UL BW subfield of the common information field is set to indicate 160 MHz BW and the subfield of the special user information field is set to indicate 80 MHz BW; or allocate a primary 160 MHz channel for the HE TB PPDU transmission, and allocate a secondary 160 MHz channel for the EHT TB PPDU transmission if the UL BW subfield of the common information field is set to indicate 160 MHz BW and the subfield of the special user information field is set to indicate 160 MHz BW.

In this embodiment, the processor 101*b* may be further configured to execute the instructions to set a third subfield of the common information field to indicate a count number of HE-LTF symbols in each HE TB PPDU to be solicited or a count number of EHT-LTF symbols in each EHT TB PPDU to be solicited. Specifically, if the first type PPDU transmission is to be solicited, the third subfield is set to indicate the number of HE-LTF symbols in each HE TB PPDU to be solicited; if the second type PPDU transmission is to be solicited, the third subfield is set to indicate the number of EHT-LTF symbols in each EHT TB PPDU to be solicited; if the third type PPDU transmission is to be solicited, the third subfield is set to indicate the number of HE-LTF symbols in each HE TB PPDU to be solicited or the number of EHT-LTF symbols in each EHT TB PPDU to be solicited. In this case, the number of HE-LTF symbols in each HE TB PPDU to be solicited is the same as the number of EHT-LTF symbols in each EHT TB PPDU to be solicited.

Alternatively, if the third type PPDU transmission is to be solicited, the processor 101*b* may be further configured to execute the instructions to set a third subfield of the common information field to indicate the number of HE-LTF symbols in each HE TB PPDU to be solicited, and set a fourth subfield of the common information field to indicate the number of EHT-LTF symbols in each EHT TB PPDU to be solicited. In this case, the number of HE-LTF symbols in each HE TB PPDU to be solicited may be different from the number of EHT-LTF symbols in each EHT TB PPDU to be solicited.

Figure 5B:
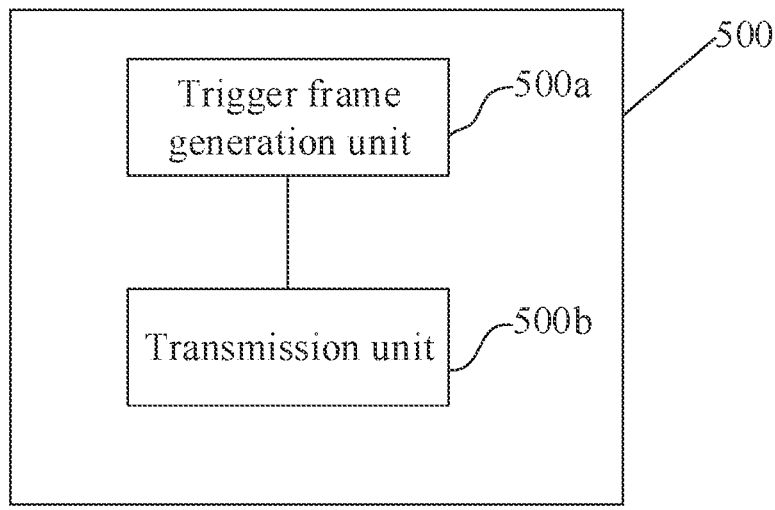
FIG. 5B is a schematic diagram illustrating a first apparatus for triggering uplink transmission in a WLAN according to one embodiment of the invention.

FIG. 5B is a schematic diagram illustrating a first apparatus 500 for triggering uplink transmission in a WLAN according to one embodiment of the invention. In this embodiment, the apparatus 500 includes a trigger frame generation unit 500*a* and a transmission unit 500*b*. The trigger frame generation unit is configured to generate a trigger frame according to the method for triggering uplink transmission in a WLAN according to some embodiments of the invention, e.g. the method described above and illustrated in FIG. 3.

Figure 6:
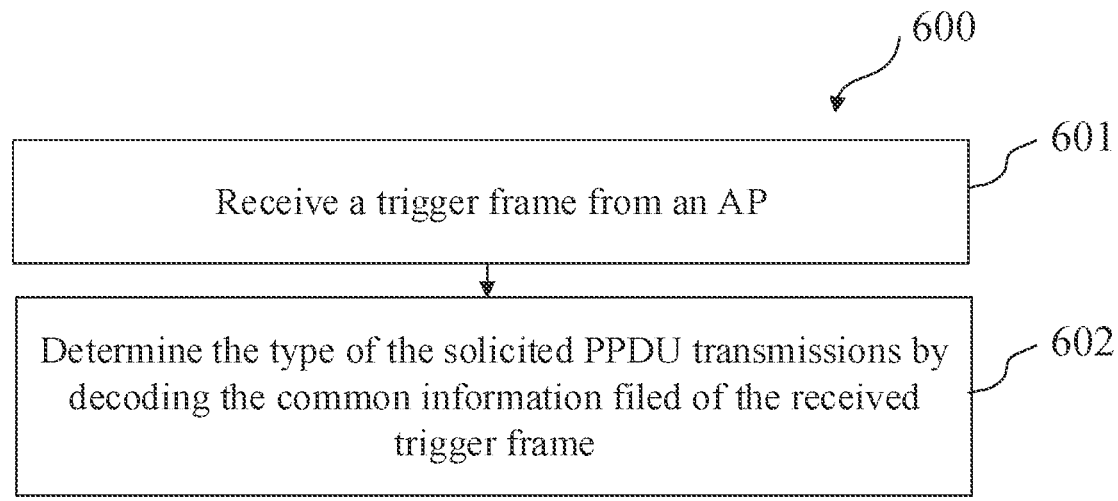
FIG. 6 is a flowchart illustrating a method for triggering uplink transmission in the WLAN implemented by a STA according to some embodiments of the invention.

FIG. 6 is a flowchart illustrating a method 600 for triggering uplink transmission in the WLAN according to some embodiments of the invention. In these embodiments, the method 600 is implemented by a STA, e.g. the HE STAs 102, R1 EHT STAs 103 and/or R2 EHT STAs 104 in FIG. 1A. In other embodiments, the method 600 may be implemented by any other suitable client device.

At block 601, a trigger frame from an AP is received by a STA, wherein the trigger frame is generated based on a type of PPDU transmissions to be solicited from a plurality of STAs, wherein a common information field of the trigger frame includes a first subfield indicating whether the trigger frame is a first type trigger frame or a second type trigger frame, and if the trigger frame is the second type trigger frame, the trigger frame further includes a second subfield indicating the type of the PPDU transmissions.

At block 602, the type of the solicited PPDU transmissions is determined by the STA by decoding the common information field of the received trigger frame.

Figure 7:
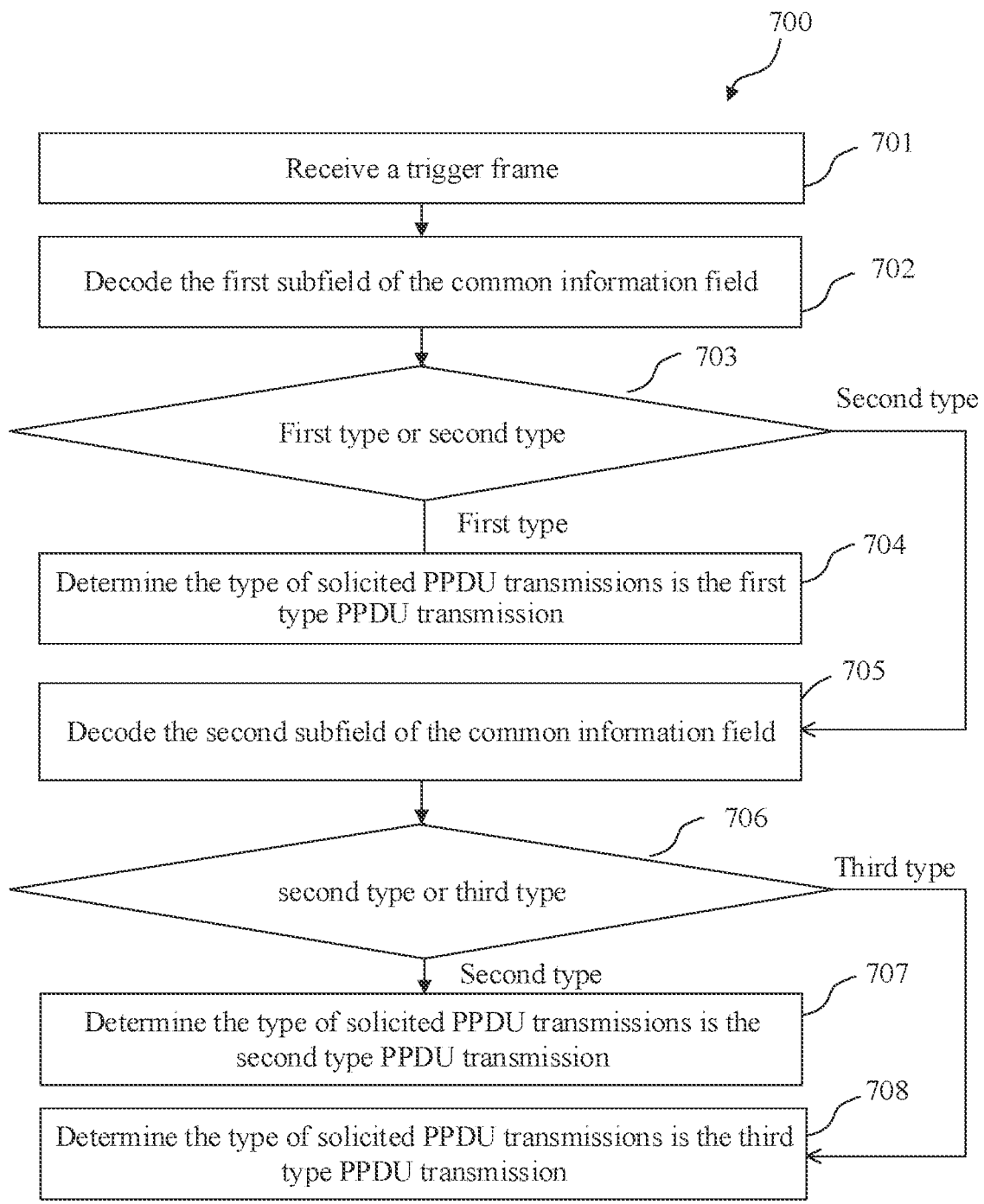
FIG. 7 is a flowchart illustrating a method for triggering uplink transmission in the WLAN implemented by a STA according to one embodiment of the invention.

FIG. 7 is a flowchart illustrating a method 700 for triggering uplink transmission in the WLAN according to one embodiment of the invention.

At block 701, a trigger frame from an AP is received by a STA.

At block 702, the first subfield of the common information field is decoded.

At block 703, if the first subfield is set to indicate that the trigger frame is the first type trigger frame, the process goes to block 704; if the first subfield is set to indicate that the trigger frame is the second type trigger frame, the process goes to block 705.

At block 704, the type of the solicited PPDU transmissions is determined to be the first type PPDU transmission.

If the STA is a R1 EHT STA or a R2 EHT STA, when the solicited PPDU transmissions is determined to be the first type PPDU transmission, the STA will identify an HE format user information field with an AID12 subfield which is matched with an AID of the STA and decode the identified HE format user information field. Further, the UL BW subfield of the common information field is to be decoded to determine a BW allocated for the first type PPDU transmission. Based on the information of the common information field and the identified HE format user information field, the STA will prepare and transmit a HE TB PPDU.

At block 705, the second subfield of the common information field is decoded to determine the solicited type of PPDU transmissions.

At block 706, if the second subfield is set to indicate that the solicited PPDU transmissions is the second type PPDU transmission, the process goes to block 707; if the second subfield is set to indicate that the type of the solicited PPDU transmissions is the third type PPDU transmission, the process goes to block 708.

At block 707, the type of the solicited PPDU transmissions is determined to be the second type PPDU transmission.

When the solicited PPDU transmissions is determined to be the second type PPDU transmission, the STA will identify an EHT format user information field with an AID12 subfield which is matched with an AID of the STA and decode the identified EHT format user information field. For example, the STA will decode at least one subfield for RU allocation of the identified EHT format user information field, e.g. a RU allocation subfield and a PS160 subfield, to determine a RU or a MRU at which an EHT TB PPDU to be transmitted by the STA; and decode a subfield, e.g. the PPDU BW subfield, of a special user information field of the received trigger frame to determine a BW allocated for the second type PPDU transmission. Based on the information of the common information field, the identified EHT format user information field and the special user information field, the STA will prepare and transmit an EHT TB PPDU.

At block 708, the type of the solicited PPDU transmissions is determined to be the third type PPDU transmission.

When the solicited PPDU transmission is determined to be the third type PPDU transmission, the STA will further decode a UL BW subfield of the common information field to determine a BW allocated for the HE TB PPDU transmission of the third type PPDU transmission; identify a user information field of the received trigger frame, which has an AID12 subfield which is matched with an AID of the STA; decode at least one subfield for RU allocation of the identified user information field to determine a RU or a MRU allocated for TB PPDU transmission from the STA; decode a subfield, e.g. PPDU BW subfield, of a special user information field of the received trigger frame to determine a BW allocated for the EHT TB PPDU transmission; and determine that a HE TB PPDU is to be transmitted if the allocated RU or MRU is located within the BW allocated for the HE TB PPDU transmission; or an EHT TB PPDU is to be transmitted if the allocated RU or MRU is located within the BW allocated for the EHT TB transmission. Alternatively, in some other embodiments of the invention, the STA may determine that an HE TB PPDU is to be transmitted if a RU is allocated to the STA and the allocated RU is located within a BW allocated for the HE TB PPDU transmission; or an EHT TB PPDU is to be transmitted if a MRU is allocated to the STA, or if a RU is allocated to the STA and the allocated RU is located within a BW allocated for the EHT TB PPDU transmission.

In this embodiment, when the solicited PPDU transmission is the third type PPDU transmission, e.g. a 320 MHz BW TB FD-A-PPDU, if the UL BW subfield of the common information field is set to indicate 80 MHz BW and the subfield, e.g. PPDU BW subfield, of the special user information field is set to indicate 160 MHz BW, the STA will transmit a HE TB PPDU in a primary 80 MHz channel, or an EHT TB PPDU in a secondary 160 MHz channel; if the UL BW subfield of the common information field is set to indicate 160 MHz BW and the subfield of the special user information field is set to indicate 80 MHz BW, the STA will transmit a HE TB PPDU in a primary 160 MHz channel, or an EHT TB PPDU in an unpunctured 80 MHz frequency segment of a secondary 160 MHz channel; or if the UL BW subfield of the common information field is set to indicate 160 MHz BW and the subfield of the special user information field is set to indicate 160 MHz BW, the STA will transmit a HE TB PPDU in a primary 160 MHz channel, or an EHT TB PPDU in a secondary 160 MHz channel.

When the third type of PPDU transmissions is solicited, if the number of HE-LTF symbols in each solicited HE TB PPDU is the same as the number of the EHT-LTF symbols in each solicited EHT TB PPDU, the STA will decode a third subfield of the common information field to determine a count number of HE-LTF symbols in a solicited HE TB PPDU or a count number of EHT-LTF symbols in a solicited EHT TB PPDU.

Alternatively, if the number of HE-LTF symbols in each solicited HE TB PPDU may be different from the number of the EHT-LTF symbols in each solicited EHT TB PPDU, the STA will decode a third subfield, e.g. a subfield named "Number of HE-LTF Symbols And Midamble Periodically" of the common information field, to determine a count number of HE-LTF symbols in a solicited HE TB PPDU; or decode a fourth subfield of the common information field to determine a count number of EHT-LTF symbols in a solicited EHT TB PPDU.

In this embodiment, the UL BW subfield of the common information field may be decoded according to a predetermined encoding rule of the UL BW subfield; the subfield, e.g. the PPDU BW subfield, of the special user information field may be decoded according to a predetermined encoding rule of this subfield; the third subfield of the common information field may be decoded based on a value indicated in the Doppler subfield of the common information field and a predetermined encoding rule of the third subfield, and the fourth subfield of the common information field may be decoded according to a predetermined rule of the fourth subfield.

Figure 8A:
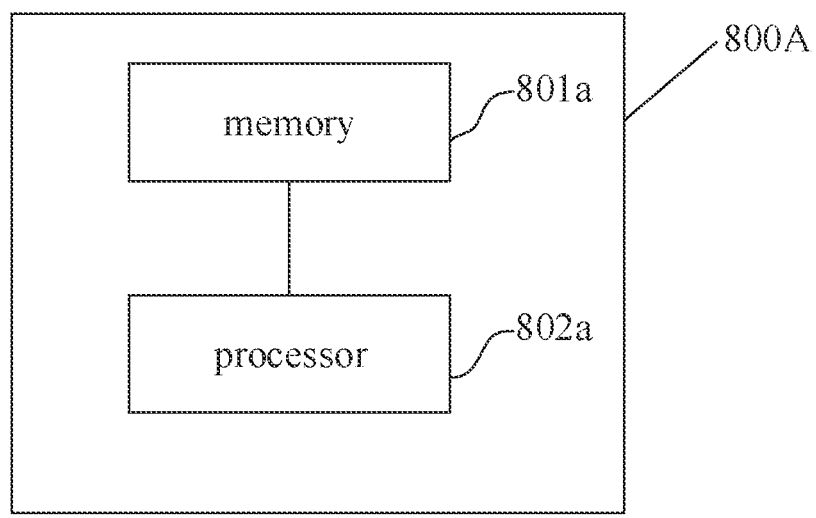
FIG. 8A is a schematic diagram illustrating a STA for triggering uplink transmission in a WLAN according to one embodiment of the invention.

FIG. 8A is a schematic diagram illustrating a STA 800A for triggering uplink transmission in a WLAN according to one embodiment of the invention. The STA 800A includes a memory 801a and a processor 802a communicably coupled with the memory. In one embodiment, the memory 801a is configured to store instructions for triggering uplink transmission in the WLAN according to some embodiments of the invention, e.g. the method 600 or the method 700 described above and illustrated in FIG. 6 and FIG. 7; and the processor 802a is configured to execute the instructions stored in the memory to perform the method for triggering uplink transmission according to some embodiments of the invention.

In this embodiment, the processor 802a is configured to execute the instructions to receive a trigger frame from an AP, wherein the trigger frame is generated based on a type of PPDU transmissions to be solicited from a plurality of STAs, wherein a common information field of the trigger frame comprises a first subfield indicating whether the trigger frame is a first type trigger frame or a second type trigger frame, and if the trigger frame is the second type trigger frame, the common information field further comprises a second subfield indicating the type of the PPDU transmissions, and determine the type of the solicited PPDU transmissions by decoding the common information field of the received trigger frame.

In this embodiment, the processor 802a is further configured to execute the instructions to decode the first subfield of the common information field; and determine that the type of the solicited PPDU transmissions is the first type PPDU transmission if the first subfield is set to indicate that the trigger frame is the first type trigger frame. Further, the processor 802a is configured to execute the instructions to decode a UL BW subfield of the common information field to determine a BW allocated for the first type PPDU transmission.

In this embodiment, the processor 802a is further configured to execute the instructions to decode the first subfield of the common information field; and if the first subfield is set to indicate that the trigger frame is the second type trigger frame, decode the second subfield of the common information field; and determine that the type of the solicited PPDU transmissions is a second type PPDU transmission if the second subfield is set to indicate that the type of PPDU transmissions is the second type PPDU transmission. Further, the processor 802a is further configured to execute the instructions to identify an EHT format user information field of the received trigger frame, which has an AID12 subfield matched with an AID of the STA; decode at least one subfield for RU allocation, e.g. a RU allocation subfield and a PS160 subfield, of the identified EHT format user information field to determine a RU or a MRU at which an EHT TB PPDU to be transmitted by the STA; and decode a subfield, e.g. the PPDU BW subfield, of a special user information field of the received trigger frame to determine a BW allocated for the second type PPDU transmission.

In this embodiment, the processor 802a is further configured to execute the instructions to decode the first subfield of the common information field; and if the first subfield is set to indicate that the received trigger frame is the second type trigger frame, decode the second subfield of the common information field; and determine that the type of the solicited PPDU transmissions is the third type PPDU transmission if the second subfield is set to indicate that the type of PPDU transmissions is the third type PPDU transmission. In this case, the processor 802a is further configured to execute the instructions to decode a UL BW subfield of the common information field to determine a BW allocated for the HE TB PPDU transmission; identify a user information field of the received trigger frame, which has an AID12 subfield matched with an AID of the STA; decode at least one subfield for RU allocation of the identified user information field to determine a RU or a MRU allocated for a TB PPDU transmission from the STA; decode a subfield, e.g. the PPDU BW subfield, of a special user information field of the received trigger frame to determine a BW allocated for the EHT TB PPDU transmission; and determine that a HE TB PPDU is to be transmitted if the allocated RU or MRU is located within the BW allocated for the HE TB PPDU transmission; or an EHT TB PPDU is to be transmitted if the allocated RU or MRU is located within the BW allocated for the EHT TB transmission. Alternatively, in some other embodiments, the processor 802a may be configured to execute the instructions to determine that an HE TB PPDU is to be transmitted if a RU is allocated to the STA and the allocated RU is located within a BW allocated for the HE TB PPDU transmission; or an EHT TB PPDU is to be transmitted if a MRU is allocated to the STA, or if a RU is allocated to the STA and the allocated RU is located within a BW allocated for the EHT TB PPDU transmission.

Further, to provide a link between the BW allocations and channel allocations for the HE TB PPDU transmission and the EHT TB PPDU transmission in the TB FD-A-PPDU transmission, the processor 802a is further configured to execute the instructions to transmit a HE TB PPDU in a primary 80 MHz channel, or an EHT TB PPDU in a secondary 160 MHz channel if the UL BW subfield of the common information field is set to indicate 80 MHz BW and the subfield of the special user information field is set to indicate 160 MHz BW; transmit a HE TB PPDU in a primary 160 MHz channel, or an EHT TB PPDU in an unpunctured 80 MHz frequency segment of a secondary 160 MHz channel if the UL BW subfield of the common information field is set to indicate 160 MHz BW and the subfield of the special user information field is set to indicate 80 MHz BW; or transmit a HE TB PPDU in a primary 160 MHz channel, or an EHT TB PPDU in a secondary 160 MHz channel if the UL BW subfield of the common information field is set to indicate 160 MHz BW and the subfield of the special user information field is set to indicate 160 MHz BW.

In this embodiment, the processor 802a may be further configured to execute the instructions to decode a third subfield of the common information field to determine a count number of HE-LTF symbols in a solicited HE TB PPDU or a count number of EHT-LTF symbols in a solicited EHT TB PPDU. Specifically, if the first type PPDU transmission is solicited, the third subfield is decoded by the STA to determine the number of HE-LTF symbols in the solicited HE TB PPDU; if the second type PPDU transmission is solicited, the third subfield is decoded by the STA to determine the number of EHT-LTF symbols in the solicited EHT TB PPDU; if the third type PPDU transmission is solicited, the third subfield is decoded by the STA to determine the number of HE-LTF symbols in the solicited HE TB PPDU or the number of EHT-LTF symbols in the solicited EHT TB PPDU.

Alternatively, if the third type TB PPDU transmission is solicited, the processor 802a may be further configured to execute the instructions to decode the third subfield to determine the number of HE-LTF symbols in a solicited HE TB PPDU, and decode a fourth subfield of the common information field to determine a count number of EHT-LTF symbols in a solicited EHT TB PPDU. It should be noted that the fourth subfield is a newly added subfield in the common information field.

Figure 8B:
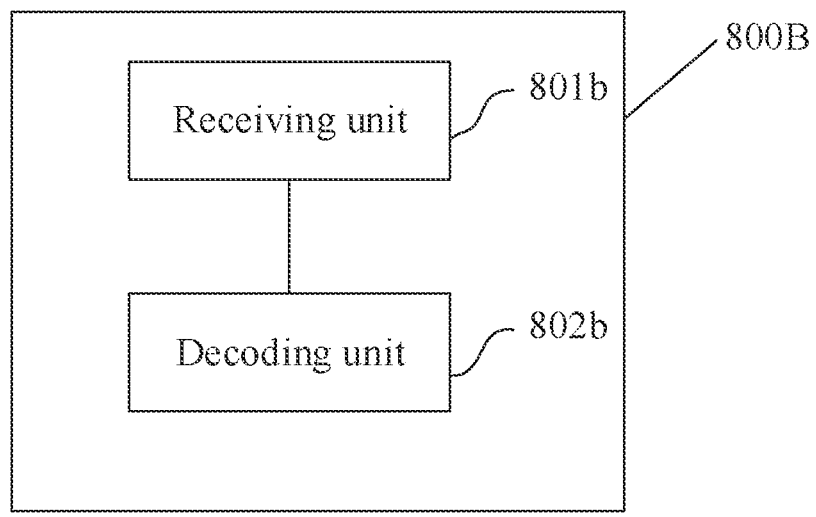
FIG. 8B is a schematic diagram illustrating a second apparatus for triggering uplink transmission in a WLAN according to one embodiment of the invention.

FIG. 8B is a schematic diagram illustrating a second apparatus 800B for triggering uplink transmission in a WLAN according to one embodiment of the invention. The apparatus 800B includes a receiving unit 801b and a decoding unit 802b, which are configured to perform the method for triggering uplink transmission in WLAN according to some embodiments of the invention, e.g. the method 600 and method 700 described above and illustrated in FIG. 6 and FIG. 7. In one embodiment, the receiving unit 801b is configured to receive a trigger frame from an AP, wherein the trigger frame is generated based on a type of PPDU transmissions to be solicited from a plurality of stations (STAs) in the WLAN, wherein a common information field of the trigger frame comprises a first subfield indicating whether the trigger frame is a first type trigger frame or a second type trigger frame, and if the trigger frame is the second type trigger frame, the trigger frame further includes a second subfield indicating the type of the PPDU transmissions; and the decoding unit 802b is configured to determine the solicited type of PPDU transmissions by decoding the common information of the received trigger frame.

Two embodiments of the invention will be described below to illustrate the details of the method for triggering uplink transmission in WLAN according to some embodiments of the invention. It should be noted that these embodiments are provided for illustrative purpose only, not to limit the scope of the invention.

Embodiment 1

FIG. 9 is a block diagram illustrating a format of the common information filed of a trigger frame according to a first embodiment of the invention. In this embodiment, the first subfield of the common information field is the Enhanced Trigger Frame Flag subfield which indicates whether the trigger frame is an 802.11ax trigger frame or an enhanced trigger frame. The Enhanced Trigger Frame Flag subfield is set to 0 to indicate the 802.11ax trigger frame; and set to 1 to indicate the enhanced trigger frame. The second subfield of the common information field is the A-PPDU Flag subfield which indicates the type of PPDU transmissions or whether a TB FD-A-PPDU transmission, i.e. the third type PPDU transmission, or an EHT TB PPDU transmission, i.e. the second type PPDU transmission, is solicited. The A-PPDU Flag subfield is set to 0 to indicate an EHT TB PPDU transmission is solicited; and set to 1 to indicate a TB FD-A-PPDU transmission is solicited. It should be noted that when the Enhanced Trigger Frame Flag subfield is set to indicate an 802.11ax trigger frame, the special user info field is not present in the trigger frame; and the A-PPDU Flag subfield is reserved.

When the trigger frame is used to solicit a first type PPDU transmission, i.e. an HE TB PPDU transmission from HE STAs, R1 EHT STAs and/or R2 EHT STAs, the Enhanced Trigger Frame Flag subfield is set to 0 to indicate the 802.11ax trigger frame, the UL BW subfield is set to indicate the BW allocated for the solicited HE TB PPDU transmission, i.e. the BW in the HE-SIG-A field of each solicited HE TB PPDU; and the Number Of HE-LTF Symbols And Midamble Periodicity subfield, together with the Doppler subfield, indicates the number of HE-LTF symbols in each solicited HE TB PPDU. In this case, a R1 EHT STA or R2 EHT STA would treat a user info field with the AID12 subfield matched with its AID as the HE format user info field and transmit an HE TB PPDU. An example of a predetermined encoding rule of the UL BW subfield when the trigger frame is used to solicit HE TB PPDU transmission is shown in Table 1. An example of a predetermined encoding rule of the Number Of HE-LTF Symbols And Midamble Periodicity subfield when the Enhanced Trigger Frame Flag subfield is set to 0 is shown in Table 2.

TABLE 1

| UL BW subfield value | BW for HE TB PPDU |
| --- | --- |
| 0 | 20 MHz |
| 1 | 40 MHz |
| 2 | 80 MHz |
| 3 | 160/80 + 80 MHz |
| 4-7 | reserved |

TABLE 2

| Number Of HE-LTF Symbols And Midamble Periodicity Subfield Value | Number of HE-LTF Symbols (Doppler = 0) | Number of HE-LTF Symbols & Midamble Periodicity (Doppler = 1) |
| --- | --- | --- |
| 0 | 1 | 1 & 10 symbols |
| 1 | 2 | 2 & 10 symbols |
| 2 | 4 | 4 & 10 symbols |
| 3 | 6 | Reserved |
| 4 | 8 | 1 & 20 symbols |
| 5 | Reserved | 2 & 20 symbols |
| 6 | Reserved | 4 & 20 symbols |
| 7 | Reserved | Reserved |

In one example, according to the predetermined encoding rules shown in Table 1 and Table 2, when the trigger frame is used to solicit 160 MHz HE TB PPDU transmission with 4 spatial streams and no midamble from HE STAs, R1 EHT STAs and/or R2 EHT STAs, the UL BW subfield is set to 3 to indicate 160/80+80 MHz BW for the solicited HE TB PPDU; the Doppler subfield is set to 0 to indicate no midamble in the solicited HE TB PPDU; and the Number Of HE-LTF Symbols And Midamble Periodicity subfield is set to 2 to indicate 4 HE-LTF symbols in the solicited HE TB PPDU.

When the trigger frame is used to solicit a second type PPDU transmission, i.e. an EHT TB PPDU transmission from R1 EHT STAs and/or R2 EHT STAs, the Enhanced Trigger Frame Flag subfield is set to 1 to indicate an enhanced trigger frame; the A-PPDU Flag subfield is set to 0 to indicate the EHT TB PPDU transmission is solicited; the PPDU BW subfield of the special user information field indicates the BW allocated for the solicited EHT TB PPDU transmission, i.e. the BW in the U-SIG of each solicited EHT TB PPDU; and the Number Of HE-LTF Symbols And Midamble Periodicity subfield is repurposed to indicate the number of EHT-LTF symbols in each solicited EHT TB PPDU. In this case, a R1 EHT STA or R2 EHT STA would treat the user information field with the AID12 subfield matched with its AID as the EHT format user info field and transmit an EHT TB PPDU. An example of a predetermined encoding rule of the PPDU BW subfield when the trigger frame is used to solicit EHT TB PPDU transmission is shown in Table 3. An example of a predetermined encoding rule of the Number Of HE-LTF Symbols And Midamble Periodicity subfield of trigger frame when the Enhanced Trigger Frame Flag subfield is set to 1 and the A-PPDU Flag subfield is set to 0 is shown in Table 4.

TABLE 3

| PPDU Bandwidth subfield value | BW for EHT TB PPDU |
| --- | --- |
| 0 | 20 MHz |
| 1 | 40 MHz |
| 2 | 80 MHz |
| 3 | 160 MHz |
| 4 | 320 MHz-1 |
| 5 | 320 MHz-2 |
| 6-7 | reserved |

TABLE 4

| Number Of HE-LTF Symbols And Midamble Periodicity Subfield Value | Number of EHT-LTF Symbols |
| --- | --- |
| 0 | 1 |
| 1 | 2 |
| 2 | 4 |
| 3 | 6 |
| 4 | 8 |
| 5 | 12 |
| 6 | 16 |
| 7 | Reserved |

In one example, according to the predetermined encoding rules shown in Table 3 and Table 4, when the trigger frame is used to solicit 320 MHz EHT TB PPDU transmission with 12 spatial streams from R1 EHT STAs and/or R2 EHT STAs, the PPDU BW subfield of the special user info field is set to 4 or 5 to indicate 320 MHz BW for the solicited EHT TB PPDU; and the Number Of HE-LTF Symbols And Midamble Periodicity subfield is set to 5 to indicate 12 EHT-LTF symbols in the solicited EHT TB PPDU.

When the trigger frame is used to solicit a third type PPDU transmission, i.e. a TB FD-A-PPDU transmission from HE STAs and R2 EHT STAs, the Enhanced Trigger Frame Flag subfield is set to 1 to indicate an enhanced trigger frame; the A-PPDU Flag subfield is set to 1 to indicate the TB FD-A-PPDU transmission is solicited; the UL BW subfield indicates the BW allocated for the HE TB PPDU transmission of the solicited TB FD-A-PPDU transmission, i.e. the BW in the HE-SIG-A field of each solicited HE TB PPDU; the PPDU BW subfield of the special user information field indicates the BW allocated for the EHT TB PPDU transmission of the solicited TB FD-A-PPDU transmission, i.e. the BW in the U-SIG field of each solicited EHT TB PPDU; and the Number Of HE-LTF Symbols And Midamble Periodicity subfield, together with the Doppler subfield, indicates the number of HE-LTF symbols in each solicited HE TB PPDU and the number of EHT-LTF symbols in each solicited EHT TB PPDU. In this embodiment, the number of HE-LTF symbols in each solicited HE TB PPDU is the same as the number of EHT-LTF symbols in each solicited EHT TB PPDU. An example of a predetermined encoding rule of the Number Of HE-LTF Symbols And Midamble Periodicity subfield when the Enhanced Trigger Frame Flag subfield is set to 1 and the A-PPDU Flag subfield is set to 1 is shown in Table 5.

TABLE 5

| Number Of HE-LTF Symbols And Midamble Periodicity Subfield Value | Number of HE-LTF/EHT-LTF Symbols (Doppler = 0) | Number of HE-LTF/EHT-LTF Symbols & Midamble Periodicity (Doppler = 1) |
| --- | --- | --- |
| 0 | 1 | 1 & 10 symbols |
| 1 | 2 | 2 & 10 symbols |
| 2 | 4 | 4 & 10 symbols |
| 3 | 6 | Reserved |
| 4 | 8 | 1 & 20 symbols |
| 5 | Reserved | 2 & 20 symbols |
| 6 | Reserved | 4 & 20 symbols |
| 7 | Reserved | Reserved |

In one example, according to the predetermined encoding rules shown in Table 1, Table 3 and Table 5, when the trigger frame is used to solicit 320 MHz BW TB FD-A-PPDU transmission comprising one 80 MHz HE TB PPDU transmission with 4 spatial streams and no midamble and one 160 MHz EHT TB PPDU transmission with 4 spatial streams, the UL BW subfield is set to 2 to indicate 80 MHz BW for the solicited HE TB PPDU transmission; the PPDU BW subfield of the special user info field is set to 3 to indicate 160 MHz BW for the solicited EHT TB PPDU transmission; the Doppler subfield is set to 0 to indicate no midamble in each solicited HE TB PPDU; and the Number Of HE-LTF Symbols And Midamble Periodicity subfield is set to 2 to indicate 4 HE-LTF symbols in each solicited HE TB PPDU and 4 EHT-LTF symbols in each solicited EHT TB PPDU.

In the first embodiment, the trigger frame can only be used to solicit TB FD-A-PPDU transmission where the number of HE-LTF symbols in each solicited HE TB PPDU is the same as the number of EHT-LTF symbols in each solicited EHT TB PPDU.

Embodiment 2

FIG. 10 is a block diagram illustrating a format of the common information filed of a trigger frame according to a second embodiment of the invention. In this embodiment, the first subfield of the common information field is the Enhanced Trigger Frame Flag subfield of the common info field which indicates whether the trigger frame is an 802.11ax trigger frame or an enhanced trigger frame. The Enhanced Trigger Frame Flag subfield is set to 0 to indicate an 802.11ax trigger frame; and set to 1 to indicate the enhanced trigger frame. The second subfield of the common information field is the A-PPDU Flag subfield which indicates the type of PPDU transmissions or whether a TB FD-A-PPDU transmission, i.e. the third type PPDU transmission, or an EHT TB PPDU transmission, i.e. the second type PPDU transmission, is solicited. The A-PPDU Flag subfield is set to 0 to indicate an EHT TB PPDU transmission is solicited; and set to 1 to indicate a TB FD-A-PPDU transmission is solicited. The Number Of EHT-LTF Symbols subfield indicates the number of EHT-LTF symbols in the solicited EHT TB PPDU. When the Enhanced Trigger Frame Flag subfield is set to indicate an 802.11ax trigger frame, the special user information field is not present in the trigger frame; and the A-PPDU Flag subfield and the Number Of EHT-LTF Symbols subfield are reserved.

When the trigger frame is used to solicit a first type PPDU transmission, i.e. an HE TB PPDU transmission from HE STAs, R1 EHT STAs and/or R2 EHT STAs, the Enhanced Trigger Frame Flag subfield is set to 0 to indicate the 802.11ax trigger frame, the UL BW subfield is set to indicate the BW allocated for the solicited HE TB PPDU transmission, i.e. the BW in the HE-SIG-A field of each solicited HE TB PPDU; and the Number Of HE-LTF Symbols And Midamble Periodicity subfield, together with the Doppler subfield, indicates the number of HE-LTF symbols in each solicited HE TB PPDU. In this case, a R1 EHT STA or R2 EHT STA would treat a user info field with the AID12 subfield equal to its AID as the HE format user info field and transmit a HE TB PPDU. The UL BW subfield, the Number Of HE-LTF Symbols And Midamble Periodicity subfield and the Doppler subfield may be set according to the predetermined encoding rules of these subfields, e.g. the examples of the predetermined encoding rules shown in Table 1 and Table 2.

When the trigger frame is used to solicit a second type PPDU transmission, i.e. an EHT TB PPDU transmission from R1 EHT STAs and/or R2 EHT STAs, the Enhanced Trigger Frame Flag subfield is set to 1 to indicate an enhanced trigger frame; the A-PPDU Flag subfield is set to 0 to indicate the EHT TB PPDU transmission is solicited; the PPDU BW subfield of the special user information field indicates the BW allocated for the solicited EHT TB PPDU transmission, i.e. the BW in the U-SIG field of each solicited EHT TB PPDU; and the Number Of EHT-LTF Symbols subfield is set to indicate the number of EHT-LTF symbols in each solicited EHT TB PPDU. An example of a predetermined encoding rule of the Number Of EHT-LTF Symbols subfield of trigger frame when the Enhanced Trigger Frame Flag subfield is set to 1 and the A-PPDU Flag subfield is set to 0 according to the second embodiment is shown in Table 6. In this case, a R1 EHT STA or R2 EHT STA would treat the user info field with the AID12 subfield matched with its AID as the EHT format user info field and transmit an EHT TB PPDU.

TABLE 6

| Number Of EHT_LTF Symbols Subfield Value | Number of EHT-LTF Symbols |
|---|---|
| 0 | 1 |
| 1 | 2 |
| 2 | 4 |
| 3 | 6 |
| 4 | 8 |
| 5 | 12 |
| 6 | 16 |
| 7 | Reserved |

In one example, according to the predetermined encoding rules shown in Table 3 and Table 6, when the trigger frame is used to solicit 320 MHz EHT TB PPDU transmission with 12 spatial streams from R1 EHT STAs and/or R2 EHT STAs, the PPDU BW subfield of the special user info field is set to 4 or 5 to indicate 320 MHz BW for the solicited EHT TB PPDU; and the Number Of EHT-LTF Symbols subfield is set to 5 to indicate 12 EHT-LTF symbols in the solicited EHT TB PPDU.

When the trigger frame is used to solicit a third type PPDU transmission, i.e. a TB FD-A-PPDU transmission from HE STAs and R2 EHT STAs, the Enhanced Trigger Frame Flag subfield is set to 1 to indicate an enhanced trigger frame; the A-PPDU Flag subfield is set to 1 to indicate the TB FD-A-PPDU transmission is solicited; the UL BW subfield indicates the BW allocated for the HE TB PPDU transmission of the solicited TB FD-A-PPDU transmission, i.e. the BW in the HE-SIG-A field of each solicited HE TB PPDU; the PPDU BW subfield of the special user information field indicates the BW allocated for the EHT TB PPDU transmission of the solicited TB FD-A-PPDU transmission, i.e. the BW in the U-SIG field of each solicited EHT TB PPDU; the Number Of HE-LTF Symbols And Midamble Periodicity subfield, together with the Doppler subfield, indicates the number of HE-LTF symbols in each solicited HE TB PPDU; and the Number Of EHT-LTF Symbols subfield indicates the number of EHT-LTF symbols in each solicited EHT TB PPDU. The UL BW subfield, the PPDU BW subfield, the Number Of HE-LTF Symbols And Midamble Periodicity subfield and the Doppler subfield, and the Number Of EHT-LTF Symbols subfield may be set according to the predetermined encoding rules of these subfields, e.g. the examples of the predetermined encoding rules shown in Table 1, Table 2, Table 3 and Table 6.

In one example, according to the predetermined encoding rules shown in Table 1, Table 2, Table 3 and Table 6, when the trigger frame is used to solicit 320 MHz BW TB FD-A-PPDU transmission comprising one 80 MHz HE TB PPDU transmission with 4 spatial streams and no midamble and one 160 MHz EHT TB PPDU transmission with 4 spatial streams, the UL BW subfield is set to 2 to indicate 80 MHz BW for the solicited HE TB PPDU transmission; the PPDU BW subfield of the special user information field is set to 3 to indicate 160 MHz BW for the solicited EHT TB PPDU transmission; the Doppler subfield is set to 0 to indicate no midamble in each solicited HE TB PPDU; the Number Of HE-LTF Symbols And Midamble Periodicity subfield is set to 2 to indicate 4 HE-LTF symbols in each solicited HE TB PPDU; and the Number Of EHT-LTF Symbols subfield is set to 2 to indicate 4 EHT-LTF symbols in each solicited EHT TB PPDU.

In the second embodiment, as two separate subfields are used to indicate the number of HE-LTF symbols in each solicited HE TB PPDU and the number of EHT-LTF symbols in each solicited EHT TB PPDU, the generated trigger frame may be used to solicit TB FD-A-PPDU transmission where the number of HE-LTF symbols in each solicited HE TB PPDU is different from the number of EHT-LTF symbols in each solicited EHT TB PPDUs.

In some embodiments of the invention, when the trigger frame is used to solicit a TB FD-A-PPDU transmission from a plurality of HE STAs and R2 EHT STA, the BW allocated for HE TB PPDU transmission is indicated in the UL BW subfield of the common information field and the BW allocated for EHT TB PPDU transmission is indicated in the PPDU BW subfield of the special user information field. One example of a predetermined encoding rule of the UL BW subfield of the common information field and the PPDU BW subfield of the special user information field when the trigger frame is used to solicit TB FD-A-PPDU transmission is shown in Table 6. The UL BW subfield is set to 2 and the PPDU BW subfield is set to 3 correspond to the BW allocation option 1 as shown in FIG. 4A. The UL BW subfield is set to 3 and the PPDU BW subfield is set to 2 correspond to the BW allocation option 2 as shown in FIG. 4B. The UL BW subfield is set to 3 and the PPDU BW subfield is set to 3 correspond to the BW allocation option 3 as shown in FIG. 4C. In other words, when the UL BW subfield is set to 2 and the PPDU BW subfield is set to 3, the BW allocated for HE TB PPDU transmission is P80 while the BW allocated for EHT TB PPDU transmission is P160. When the UL BW subfield is set to 3 and the PPDU BW subfield is set to 2, the BW allocated for HE TB PPDU transmission is P160 while the BW allocated for EHT TB PPDU transmission is an unpunctured 80 MHz frequency segment of S160. When the UL BW subfield is set to 3 and the PPDU BW subfield is set to 3, the BW allocated for HE TB PPDU transmission is P160 while the BW allocated for EHT TB PPDU transmission is S160.

In some embodiments of the invention, when the trigger frame is used to solicit, a third type PPDU transmission, i.e. a TB FD-A-PPDU transmission from a plurality of HE STAs and R2 EHT STAs, a R1 EHT STA would treat the user info field with the AID12 subfield matched with its AID as the EHT format user information field and transmit an EHT TB PPDU. A R2 EHT STA would treat the user information field with the AID12 subfield matched with its AID as the HE format user information field or the EHT format user information field depending on whether the allocated RU or MRU is located within the BW allocated for HE TB PPDU transmission or EHT TB PPDU transmission. Specifically, a R2 EHT STA would treat the user info field with the AID12 subfield matched with its AID as the HE format user information field when the allocated RU or MRU is located within the BW allocated for the HE TB PPDU transmission; and would treat the user information field with the AID12 subfield matched with its AID as the EHT format user info field when the allocated RU or MRU is located within the BW allocated for the EHT TB PPDU transmission.

Embodiments of the invention also provide a computer product comprising instructions to cause a computer to perform any method for triggering uplink transmission according to any embodiment of the invention, when executed thereon.

At least some steps of the methods for triggering uplink transmission according to any embodiments of the invention described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

As described above, with the methods and apparatuses provided in various embodiments of the invention, the proposed enhanced trigger frame may be used to solicit different types of PPDU transmissions in a WLAN as a first subfield is introduced in the common information field of the trigger frame to indicate the type of the trigger frame, i.e. whether the trigger frame is an existing 802.11ax trigger frame or an enhanced trigger frame, and a second subfield is further introduced to indicate the type of the PPDU transmissions to be solicited, i.e. whether an EHT TB PPDU transmission or a TB FD-A-PPDU transmission is solicited, when the first subfield indicates that the trigger frame is an enhanced trigger frame.

Further, in some embodiments of the invention, when a TB A-PPDU transmission is solicited, the BW allocated for the EH TB PPDU transmission in the TB FD-A-PPDU transmission and the BW allocated for the EHT TB PPDU transmission in the TB F-A-PPDU transmission are indicated by a UL BW subfield in the common information field and a PPDU BW subfield in the special user information field respectively. Also, a method for linking the BW allocations with corresponding channel allocations for the EH TB PPDU transmission and the EHT TB PPDU transmission is provided in one embodiment of the invention. In addition, in some embodiments of the invention, two separate subfields in the common information field are used to indicate the number of HE-LTF symbols in each solicited HE TB PPDU and the number of EHT-LTF symbols in the solicited EHT TB PPDU so that the trigger frame may be used to solicit a TB FD-A PPDU transmission in which the number of HE-LTF symbols in each solicited HE TB PPDU is different from the number of EHT-LTF symbols in the solicited EHT TB PPDU.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for triggering uplink transmission in a wireless local area network (WLAN), the method comprising:
    generating, by an access point (AP), a trigger frame based on a type of physical layer protocol data unit (PPDU) transmissions to be solicited from a plurality of stations (STAs) in the WLAN, a common information field of the trigger frame comprising a first subfield indicating whether or not a special user information field is present in the trigger frame,
    when the first subfield indicates that the special user information field is present in the trigger frame, the trigger frame is an enhanced trigger frame; wherein the special user information field is located immediately after the common information field, the common information field includes an aggregated PPDU (A-PPDU) Flag subfield indicating whether a trigger-based frequency domain aggregated PPDU (TB FD-A-PPDU) transmission or an extremely high throughput trigger-based PPDU (EHT TB PPDU) transmission is solicited, and the A-PPDU Flag subfield is set to 0 to indicate the EHT TB PPDU transmission is solicited, and set to 1 to indicate the TB FD-A-PPDU transmission is solicited; and
    when the TB FD-A-PPDU transmission is solicited and a bandwidth (BW) of the TB FD-A-PPDU is set to 320 MHz, a BW allocated for a high efficiency (HE) TB PPDU transmission indicated by a UL BW subfield of the common information field is a primary 80 MHz channel (P80) or a primary 160 MHz channel (P160), while a BW allocated for an extremely high throughput (EHT) PPDU transmission from release 2 (R2) EHT STAs indicated by a subfield of the special user information field is a secondary 160 MHz channel (S160); and
    transmitting, by the AP, the generated trigger frame to the plurality of STAs.

2. The method according to claim 1, wherein the special user information field carries necessary universal SIGNAL (U-SIG) subfields of the solicited PPDUs.

3. The method according to claim 1, wherein the solicited PPDU transmissions are EHT TB PPDUs.

4. An access point (AP) for triggering uplink transmission in a wireless local area network (WLAN), the AP comprising: a memory configured to store instructions for triggering uplink transmission in the WLAN, and a processor communicably coupled with the memory, wherein the processor is configured to execute the instructions to:
- generate a trigger frame based on a type of physical layer protocol data unit (PPDU) transmissions to be solicited from a plurality of stations (STAs) in the WLAN, a common information field of the trigger frame comprising a first subfield indicating whether or not a special user information field is present in the trigger frame,
- when the first subfield indicates that the special user information field is present in the trigger frame, the trigger frame is an enhanced trigger frame; wherein the special user information field is located immediately after the common information field, the common information field includes an aggregated PPDU (A-PPDU) Flag subfield indicating whether a trigger-based frequency domain aggregated PPDU (TB FD-A-PPDU) transmission or an extremely high throughput trigger-based PPDU (EHT TB PPDU) transmission is solicited, and the A-PPDU Flag subfield is set to 0 to indicate the EHT TB PPDU transmission is solicited, and set to 1 to indicate the TB FD-A-PPDU transmission is solicited; and
- when the TB FD-A-PPDU transmission is solicited and a bandwidth (BW) of the TB FD-A-PPDU is set to 320 MHZ, a BW allocated for a high efficiency (HE) TB PPDU transmission indicated by a UL BW subfield of the common information field is a primary 80 MHz channel (P80) or a primary 160 MHz channel (P160), while a BW allocated for an extremely high throughput (EHT) PPDU transmission from release 2 (R2) EHT STAs indicated by a subfield of the special user information field is a secondary 160 MHz channel (S160); and
- transmit the generated trigger frame to the plurality of STAs.

5. The AP according to claim 4, wherein the special user information field carries necessary universal SIGNAL (U-SIG) subfields of the solicited PPDUs.

6. The AP according to claim 4, wherein the solicited PPDU transmissions are EHT TB PPDUs.

7. A non-transitory computer-readable storage medium, having instructions stored thereon, wherein the instructions, when executed by a processor of an access point (AP), cause the AP to perform a method for triggering uplink transmission in a wireless local area network (WLAN), comprising:
- generate a trigger frame based on a type of physical layer protocol data unit (PPDU) transmissions to be solicited from a plurality of stations (STAs) in the WLAN, a common information field of the trigger frame comprising a first subfield indicating whether or not a special user information field is present in the trigger frame,
- when the first subfield indicates that the special user information field is present in the trigger frame, the trigger frame is an enhanced trigger frame; wherein the special user information field is located immediately after the common information field, the common information field includes an aggregated PPDU (A-PPDU) Flag subfield indicating whether a trigger-based frequency domain aggregated PPDU (TB FD-A-PPDU) transmission or an extremely high throughput trigger-based PPDU (EHT TB PPDU) transmission is solicited, and the A-PPDU Flag subfield is set to 0 to indicate the EHT TB PPDU transmission is solicited, and set to 1 to indicate the TB FD-A-PPDU transmission is solicited; and
- when the TB FD-A-PPDU transmission is solicited and a bandwidth (BW) of the TB FD-A-PPDU is set to 320 MHz, a BW allocated for a high efficiency (HE) TB PPDU transmission indicated by a UL BW subfield of the common information field is a primary 80 MHz channel (P80) or a primary 160 MHz channel (P160), while a BW allocated for an extremely high throughput (EHT) PPDU transmission from release 2 (R2) EHT STAs indicated by a subfield of the special user information field is a secondary 160 MHz channel (S160); and
- transmit the generated trigger frame to the plurality of STAs.

* * * * *